United States Patent
Yang

(10) Patent No.: US 12,261,915 B2
(45) Date of Patent: Mar. 25, 2025

(54) RESTORATION OF A PDN CONNECTION AT PGW FAILURE

(71) Applicant: Telefonaktiebolaget LM Ericsson (publ), Stockholm (SE)

(72) Inventor: Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/511,182

(22) Filed: Nov. 16, 2023

(65) Prior Publication Data

US 2024/0098148 A1    Mar. 21, 2024

Related U.S. Application Data

(63) Continuation of application No. 18/026,844, filed as application No. PCT/EP2021/075757 on Sep. 20, 2021, now Pat. No. 11,870,854.

(60) Provisional application No. 63/081,066, filed on Sep. 21, 2020.

(51) Int. Cl.
*H04L 67/141* (2022.01)
*H04L 61/4511* (2022.01)

(52) U.S. Cl.
CPC ........ *H04L 67/141* (2013.01); *H04L 61/4511* (2022.05)

(58) Field of Classification Search
CPC ........................... H04L 67/141; H04L 61/4511
USPC ............................................................ 709/227
See application file for complete search history.

(56) References Cited

U.S. PATENT DOCUMENTS

| 11,456,989 | B2 | 9/2022 | Bagwell |
| 2021/0297383 | A1* | 9/2021 | Bagwell .................. H04L 43/20 |
| 2023/0028642 | A1 | 1/2023 | Li et al. |

(Continued)

FOREIGN PATENT DOCUMENTS

WO    WO-2022058579 A1 *    3/2022    ......... H04L 61/3025

OTHER PUBLICATIONS

Ericsson, "SP-191115: Correction to EPS-5GS idle mobility with N26," 3GPP TSG SA Meeting #SP-86, Dec. 11-13, 2019, Sitges, Spain, 12 pages.

(Continued)

*Primary Examiner* — Anthony Mejia
(74) *Attorney, Agent, or Firm* — Withrow & Terranova, PLLC

(57) ABSTRACT

A method of operation of a cellular communications system is disclosed. The method comprises: at a MME: receiving an attach request from a UE; sending a location update request to a HSS; receiving a location update acknowledgement; sending, to a DNS, a DNS query request comprising an APN FQDN; receiving a DNS query response comprising information that indicates candidate PGWs that satisfy the DNS query request and at least two PGWs belonging to a same PGW set; selecting the first PGW; sending, to a SGW, a first create session request that comprises information that indicates the first PGW; receiving a first create session response; sending an attach accept to the UE; and at the SGW: receiving the first create session request from the MME; forwarding the first create session request to the first PGW; receiving the first create session response; and forwarding the first create session response to the MME.

11 Claims, 14 Drawing Sheets

Reproduction of Figure 4.2.1-1 from 3GPP TS 23.401 - Non-roaming architecture for 3GPP accesses

(56) References Cited

U.S. PATENT DOCUMENTS

2023/0336630 A1* 10/2023 Yang .................. H04L 61/4511

OTHER PUBLICATIONS

Huawei, "C4-204395: Small data rate control and Serving PLMN rate control," 3GPP TSG-CT WG4 Meeting #99e, Aug. 18-28, 2020, Electronic Meeting, 9 pages.
Nokia, et al., "C4-203147: Data rate control during mobility between 5G5 and EPS," 3GPP TSG-CT WG4 Meeting #98e, Jun. 2-12, 2020, 19 pages.
Notice of Reasons for Refusal for Japanese Patent Application No. 2023-518092, mailed Apr. 2, 2024, 5 pages.
Decision to Grant for Japanese Patent Application No. 2023-518092, mailed Aug. 20, 2024, 6 pages.
Author Unknown, "Technical Specification Group Core Network and Terminals; Numbering, addressing and identification; (Release 16)," Technical Specification 23.003, Version 16.3.0, Jun. 2020, 3GPP Organizational Partners, 141 pages.
Author Unknown, "Technical Specification Group Core Network and Terminals; Restoration procedures; (Release 16)," Technical Specification 23.007, Version 16.1.0, Mar. 2020, 3GPP Organizational Partners, 109 pages.
Author Unknown, "Technical Specification Group Services and System Aspects; Architecture enhancements for control and user plane separation of EPC nodes; Stage 2 (Release 16)," Technical Specification 23.214, Version 16.1.0, Jul. 2020, 3GPP Organizational Partners, 93 pages.
Author Unknown, "Technical Specification Group Services and System Aspects; General Packet Radio Service (GPRS) enhancements for Evolved Universal Terrestrial Radio Access Network (E-UTRAN) access (Release 16)," Technical Specification 23.401, Version 16.7.0, Jul. 2020, 3GPP Organizational Partners, 440 pages.
Author Unknown, "Technical Specification Group Services and System Aspects; System architecture for the 5G System (5GS); Stage 2 (Release 16)," Technical Specification 23.501, Version 16.5.0, Jul. 2020, 3GPP Organizational Partners, 441 pages.
Author Unknown, "Technical Specification Group Core Network and Terminals; Evolved Packet System (EPS); Mobility Management Entity (MME) and Serving GPRS Support Node (SGSN) related interfaces based on Diameter protocol (Release 16)," Technical Specification 29.272, Version 16.3.0, Jun. 2020, 3GPP Organizational Partners, 177 pages.
Author Unknown, "Technical Specification Group Core Network and Terminals; Evolved Packet System (EPS); 3GPP EPS AAA interfaces (Release 16)," Technical Specification 29.273, Version 16.1.0, Jun. 2020, 3GPP Organizational Partners, 200 pages.
Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 16)," Technical Specification 29.274, Version 16.4.0, Jun. 2020, 3GPP Organizational Partners, 393 pages.
Author Unknown, "Technical Specification Group Core Network and Terminals; Domain Name System Procedures; Stage 3; (Release 16)," Technical Specification 29.303, Version 16.3.0, Jun. 2020, 3GPP Organizational Partners, 79 pages.
Daigle, et al., "Domain-Based Application Service Location using SRV RRs and the Dynamic Delegation Discovery Service (DDDS)," Request for Comments 3958, Jan. 2005, The Internet Society, 25 pages.
Nokia, et al., "C4-204184: Restoration of PDN connections after a PGW-C/SMF failure, restart or scale-in," 3GPP TSG-CT WG4 Meeting #99e, Aug. 18-28, 2020, Electronic Meeting, 8 pages.
Intention to Grant for European Patent Application No. 21782893.8, mailed Oct. 26, 2023, 7 pages.
International Search Report and Written Opinion for International Patent Application No. PCT/EP2021/075757, mailed Jan. 4, 2022, 11 pages.
International Preliminary Report on Patentability for International Patent Application No. PCT/EP2021/075757, mailed Aug. 26, 2022, 21 pages.
Notice of Allowance for U.S. Appl. No. 18/026,844, mailed Aug. 29, 2023, 8 pages.
Notice of Allowability for U.S. Appl. No. 18/026,844, mailed Sep. 18, 2023, 4 pages.

* cited by examiner

Reproduction of Figure 4.3.1-1 from 3GPP TS 23.501 - Non-roaming architecture for interworking between 5GS and EPC/E-UTRAN Reproduction of Figure 4.2.1-1 from 3GPP TS 23.401 - Non-roaming architecture for 3GPP accesses

*Reproduction of Figure 4.2.1-1 from 3GPP TS 23.214 - Architecture reference model with separation of user plane and control plane for non-roaming and roaming scenarios*

RESTORATION OF A PDN CONNECTION AT PGW FAILURE

This application is a continuation of U.S. patent application Ser. No. 18/026,844, filed Mar. 17, 2023, which is a 35 U.S.C. § 371 national phase filing of International Application No. PCT/EP2021/075757, filed Sep. 20, 2021, which claims the benefit of provisional patent application Ser. No. 63/081,066, filed Sep. 21, 2020, the disclosures of which are incorporated herein by reference in their entireties.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In Release 16, the Third Generation Partnership Project (3 GPP) has further broadened the use of the Network Function Set concept to be applicable for all types of Network Functions (NFs) in the Fifth Generation (5 G) Core (5 GC), e.g. several Session Management Functions (SMFs) can form an SMF Set.

The following is a list of definitions from 3 GPP Technical Specification (TS) 23.501 (see, e.g., V15.5.1) related to NF service, NF service set, and NF set:
  NF instance: an identifiable instance of the NF.
  NF service: a functionality exposed by a NF through a service based interface and consumed by other authorized NFs.
  NF service instance: an identifiable instance of the NF service.
  NF service operation: An elementary unit a NF service is composed of.
  NF Service Set: A group of interchangeable NF service instances of the same service type within an NF instance. The NF service instances in the same NF Service Set have access to the same context data.
  NF Set: A group of interchangeable NF instances of the same type, supporting the same services and the same Network Slice(s). The NF instances in the same NF Set may be geographically distributed but have access to the same context data.

As specified in section 5.21.3.1 of 3 GPP TS 23.501, a NF instance can be deployed such that several NF instances are present within an NF Set to provide distribution, redundancy, and scalability together as a set of NF instances. If so, a NF can be replaced by an alternative NF within the same NF Set in case of scenarios such as failure, load balancing, load re-balancing. So, for example, another SMF can take over a Protocol Data Unit (PDU) Session which was handled by the SMF pertaining to the same SMF set.

FIG. 1

In order to support the mobility between Fourth Generation (4 G) and 5 G, a combined Packet Data Network (PDN) Gateway (PGW) and SMF is required. This is illustrated in FIG. 4.3.1-1 ( ) of 3 GPP TS 23.501, which is reproduced herein as FIG. 1.

FIGS. 2 and 3

Without the SMF Set concept, e.g. for Evolved Packet System (EPS) (see FIGS. 2 and 3 from 3 GPP TS 23.401), when a PGW has failed i.e. without restart or has restarted, the PDN Connections which were handled by this PGW can NOT be retained. The Mobility Management Entity (MME) has to request User Equipments (UEs) to RE-ESTABLISH the affected PDN connections.

FIG. 4

FIG. 4 is a reproduction of FIG. 4.2.1-1 from 3 GPP TS 23.214 and describes the network scenario where the control plane and user plane are separated. In this present disclosure, only PGW Control Plane (PGW-C) failure is addressed. The user plane path, from the Operator's Internet Protocol (IP) services over SGi, PGW User Plane (PGW-U), SGW User Plane (SGW-U) and over S1-U to the evolved Node B (eNB) may be fine.

Nokia has raised an issue and proposed an enhancement the Change Request (CR) C4-204184, which is attached herein as Appendix A

SUMMARY

There currently exist certain challenge(s). The proposed solution as described in the Nokia CR (CR C4-204184) has the following drawbacks:
  1. It requires an update in the DNS server to introduce a new DNS record for PGW/SMF Set ID FQDN, so that the MME can run DNS procedure to retrieve a list of alternative PGWs, this requires additional DNS signaling procedure; (Author's comment. This extra signaling. It is desirable to avoid such extra signaling.
  2. After the MME selects an alternative PGW, the CR proposes that the MME sends a Modify Bearer Request message. This has big impacts on the existing MME/SGW implementation, where the Modify Bearer Request can not include PGW's new F-TEID, the SGW identifies the PDN connection using its own F-TEID on S11, and the SGW finds the corresponding PGW F-TEID over S5/S8.
    "The MME should then select an alternative PGW-C/SMF using the PGW Set FQDN and send a Modify Bearer Request towards the newly selected PGW-C/SMF via the SGW, including the UE's identity (IMSI or IMEI if no IMSI is available) and the Linked EPS Bearer Identity (identifying the default EPS bearer identity of the PDN connection)."
  3. The (new) PGW may update its PGW F-TEID using Update Bearer Request message. This will impact both SGW and MME because they have to store the information to be used later.

In summary, the proposed solution as described in the Nokia CR has some unnecessary impacts on the legacy SGW.

Certain aspects of the present disclosure and their embodiments may provide solutions to the aforementioned or other challenges. Embodiments of the present disclosure provide a new Doman Name Server (DNS) solution and some enhancements to the solution proposed in C4-204184 to enable restoration of the PDN connections when the serving PGW/SMF has failed while the failed PGW/SMF pertains to a PGW/SMF set.

The embodiments of the present disclosure described herein include either or both of the following two aspects:
A. new DNS solution, and
B. enhancements to the proposed solution (C4-204-184), each of which is described below.

BRIEF DESCRIPTION OF THE DRAWINGS

The accompanying drawings, which are incorporated herein and form part of the specification, illustrate various embodiments.

DETAILED DESCRIPTION

A. Enhanced DNS Solution

Figure 1:
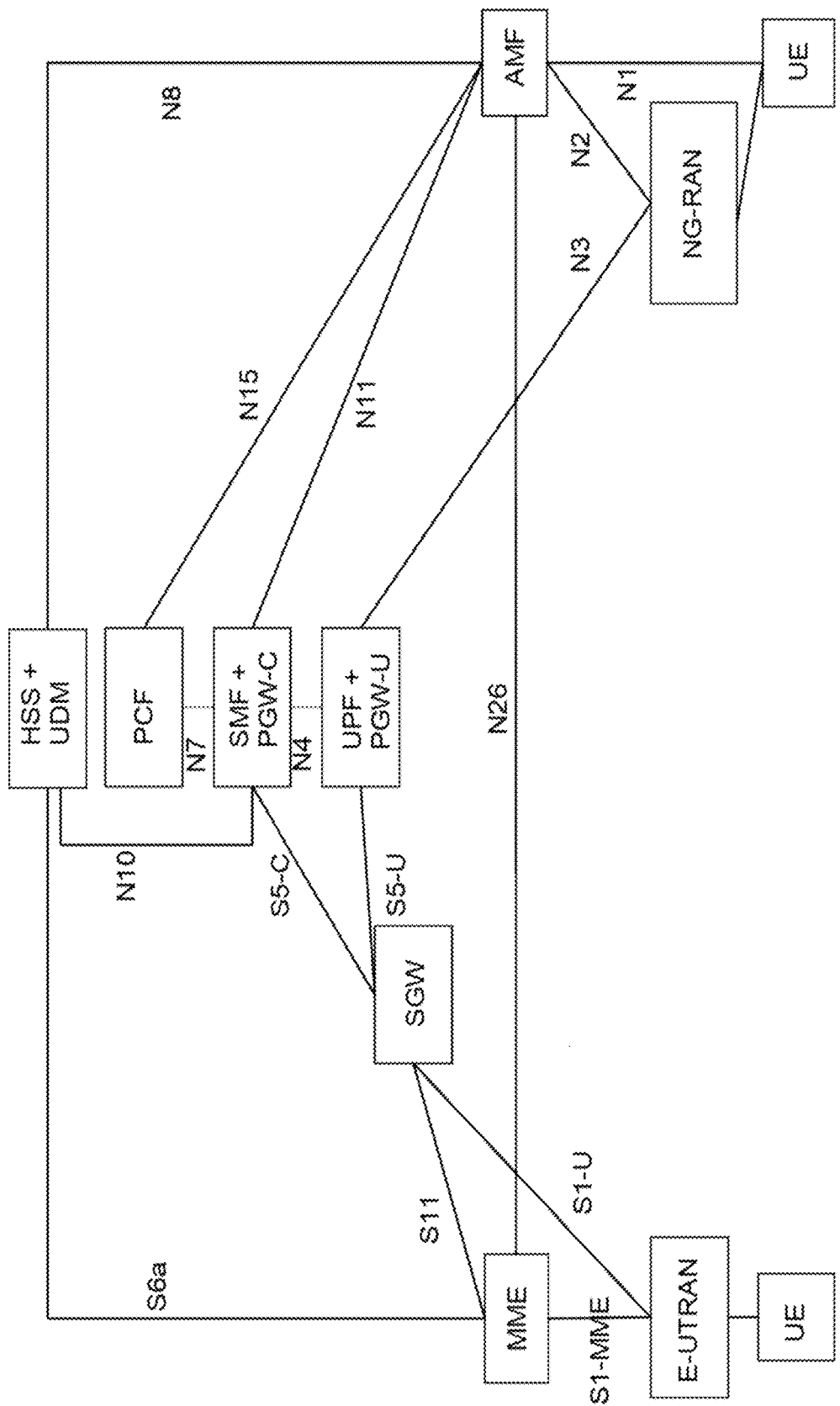
FIG. 1 illustrates a Non-roaming architecture for inter-working between 5 GS and EPC/E-UTRAN.
Figure 2:
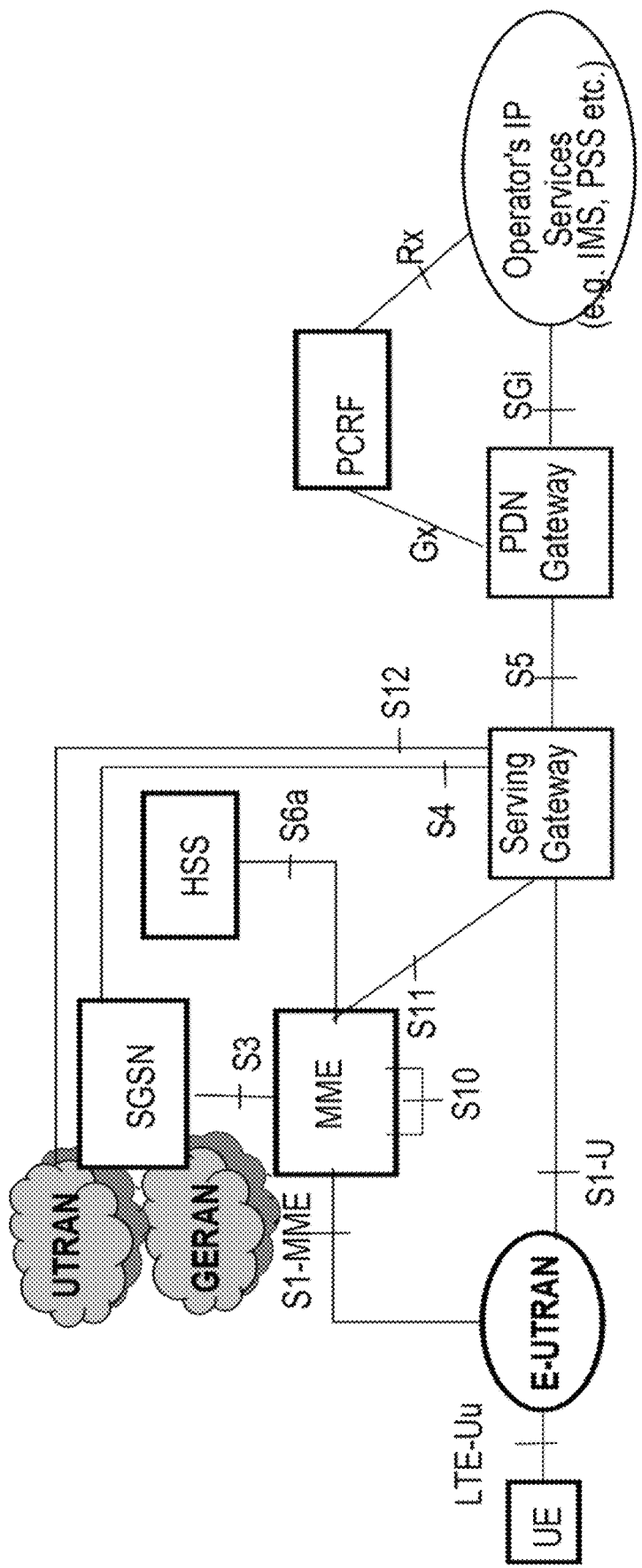
FIG. 2 illustrates a Non-roaming architecture for 3 GPP access.
Figure 3:
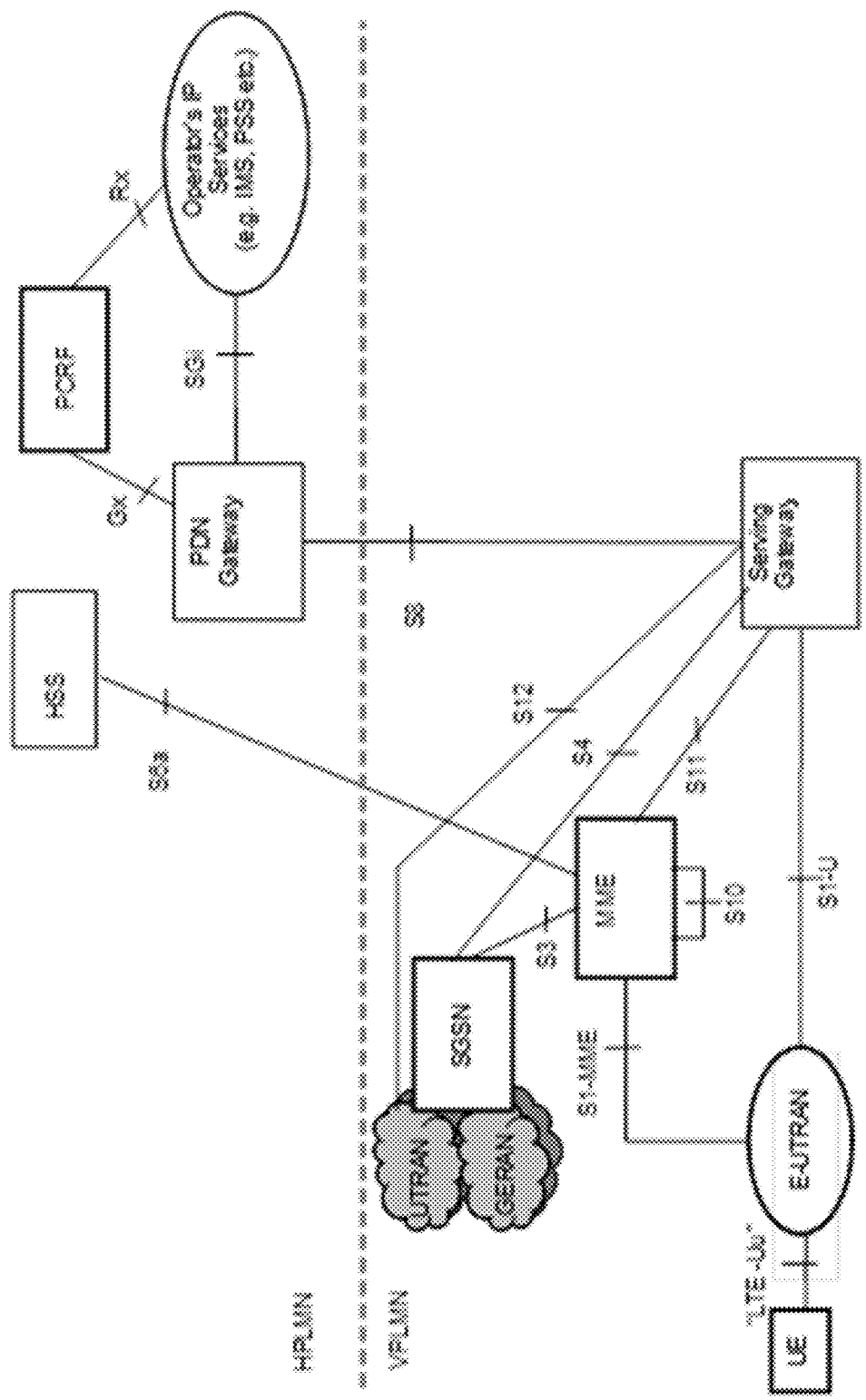
FIG. 3 illustrates a roaming architecture for 3 GPP access.
Figure 4:
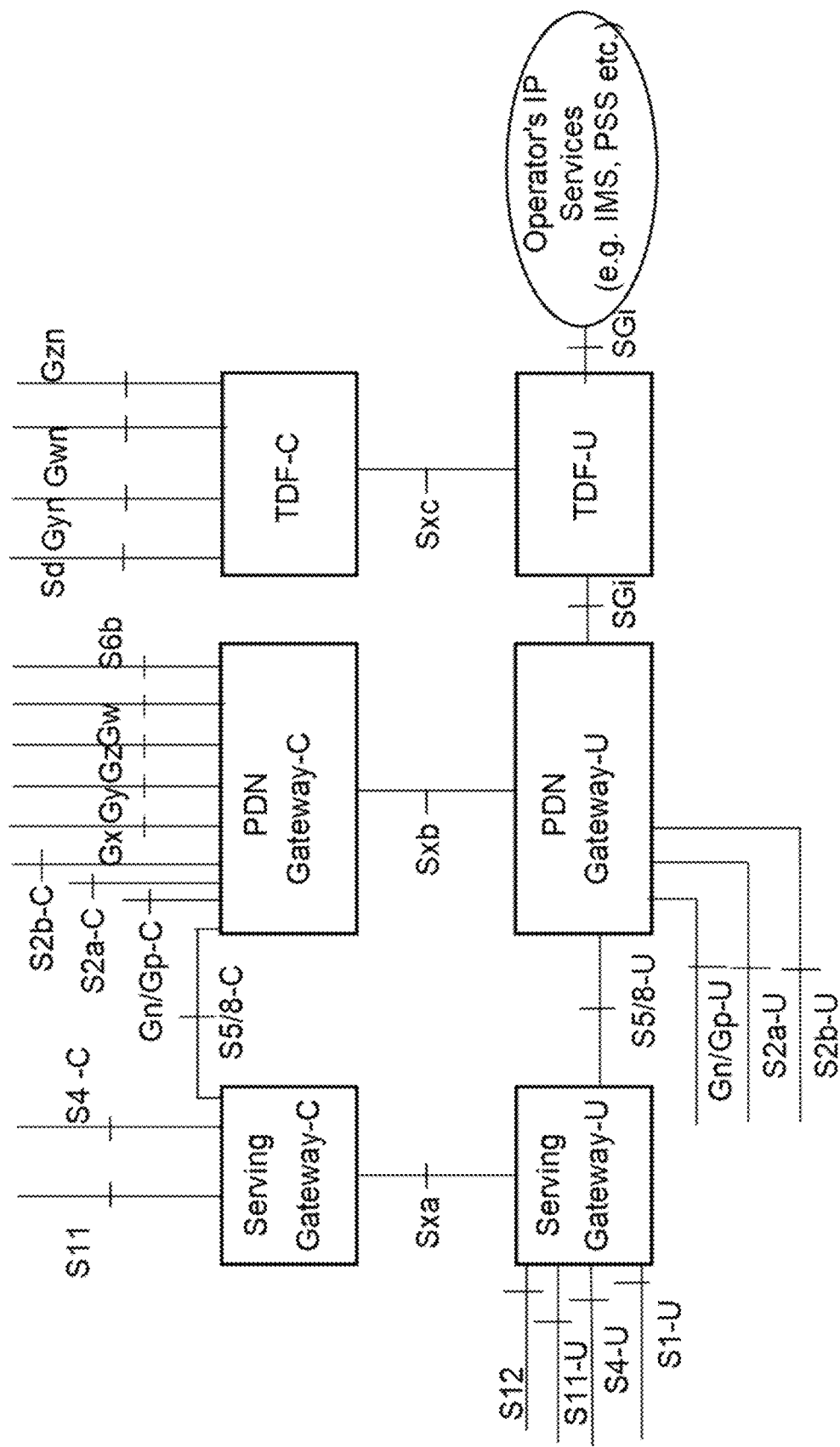
FIG. 4 describes a network scenario where the control plane and user plane are separated.

Since the PGW/SMF pertaining to the same PGW/SMF set will have the same functionalities, the PDN connection created by any of these PGWs can be handover or served by any other PGW in the same PGW/SMF set. That means that, when the MME performs the DNS procedure to select a PGW, all PGWs in the same set will appear in the response message. In one embodiment, information is added in the PGW Name Authority Pointer (NAPTR) records in the DNS to enable the MME to know that these PGWs pertain to the same PGW set.

Hence, in one embodiment of the present disclosure, the PGW NAPTR record is enhanced, considering support of the NF set concept as a new network capability. In one example embodiment, "+nc-set<setId>" is appended to the "app-protocol" name as specified in 3 GPP TS 23.003 (see, e.g., V16.3.0), clause 19.4.3, where the set<setId> is set to the first label of NF Set Id of a SMF set, as specified in clause 28.12 of 3 GPP TS 23.003. In one embodiment, a completely new character string e.g. "+set-<setId>" is appended to the "app-protocol" name as specified in TS 23.003, clause 19.4.3.

For example, in one embodiment, the follow string is added into a PGW NAPTR record:
x-3gpp-pgw: x-s5-gtp+nc-set<setId>", "x-3gpp-pgw: x-s8-gtp+nc-set<setId>" or
x-3gpp-pgw: x-s5-gtp+set-<setId>", "x-3gpp-pgw: x-s8-gtp+set-<setId>"

In this example, the MME is trying to select a PGW for the Access Point Name (APN) "imsTV1". Therefore, the MME uses the APN's Fully Qualified Domain Name (FQDN) to perform a DNS query for the NAPTR record of the PGW. Then, in the DNS server, it may configure as below for PGW/SMFs pertaining to a PGW/SMF set.

```
imsTV1.apn     (
; IN NAPTR order pref. flag service              regexp replacement
  IN NAPTR 100 999 "a" "x-3gpp-pgw:x-s5-gtp+nc-set100:x-s8-gtp+nc-set100"    ""
topoff.vip1.gw01.nodes )
  IN NAPTR 200 999 "a" "x-3gpp-pgw:x-s5-gtp+nc-set100:x-s8-gtp+nc-set100"    ""
topoff.vip1.gw21.nodes
;
;
```

In above example, both gw01 and gw21 are pertaining to (e.g., belong to) a set with setId=100.

In this example, the PGW/SMF SET FQDN will be "set100.smfset.5gc.mnc012.mcc345"

The bolded+nc-set100, may use a new character string, e.g. set-100, instead.

Note that, with Solution A, there will be even less SGW impact. The only impact is that the new PGW (taking over the old PGW) may still use Update Bearer Request message to inform the MME. See Enhancement 4 in Solution B below. While not essential for understanding the solutions described herein, the interested reader can also refer to 3 GPP TS 29.303, clause 5.8.2 SGW, PGW and GGSN Selection Procedure.

B. Enhancements to the Proposed Solution of CR C4-204184

In some embodiments, systems and methods are disclosed herein that use one or more of the following enhancements to the solution described in CR C4-204184.

Enhancement 1: In the Create Session Response message sent from the PGW, in addition to the PGW SET FQDN, the PGW may include a list of alternative PGW IP Addresses to be used by the MME in case the serving PGW has failed;

Enhancement 2: In addition to using PGW Restart Indication message to notify the MME that PGW has restarted or has failed, the MME can derive the PGW failure and re-select another alternative PGW if it receives a GTPv2 cause #100 (See clause 8.4 of TS 29.274) "Remote peer not responding" from the SGW. This is to solve the PGW partial failure.

Enhancement 3: When the MME has decided to reselect an alternative PGW, the MME uses (e.g., always) a Create Session Request message as in an SGW relocation procedure (as specified in 5.10.4 in TS 23.401) instead of using a Modify Bearer Request message. The MME sends the Create Session Request message with new PGW F-TEID of the alternative PGW to a (new) SGW. If the Create Session Request message was sent to the existing SGW, the existing SGW should consider this as a colliding case, as specified in 7.2.1 of TS 29.274 as below, but the SGW should keep the same SGW-U tunnel over S1 (towards eNB) and over S5/S8 (towards PGW-U) to avoid the signaling towards the SGW-U considering the remote S1 eNB GTP-U tunnel endpoint if available and remote S5/S8 PGW-U GTP-U tunnel endpoint provided by the MME in the Create Session Request message is the same as the existing ones (since user plane path is not impacted).

If the new Create Session Request received by the SGW collides with an existing active PDN connection context (the existing PDN connection context is identified with the tuple [IMSI, EPS Bearer ID], where IMSI shall be replaced by TAC and SNR part of ME Identity for emergency or RLOS attached UE without UICC or authenticated IMSI), this Create Session Request shall be treated as a request for a new session. Before creating the new session, the SGW should delete:

the existing PDN connection context locally, if the Create Session Request is received with the TEID set to zero in the header, or if it is received with a TEID not set to zero in the header and it collides with the default bearer of an existing PDN connection context;

the existing dedicated bearer context locally, if the Create Session Request collides with an existing dedicated bearer context and the message is received with a TEID not set to zero in the header.

In the former case, if the PGW S5/S8 IP address for control plane received in the new Create Session Request is different from the PGW S5/S8 IP address for control plane of the existing PDN connection, the SGW should also delete the existing PDN connection in the corresponding PGW by sending a Delete Session Request message.

NOTE that, the MME need not immediately to send Create Session Request message, e.g. for those UEs in idle mode.

Enhancement 4: When the failed PGW or a new PGW (taking over the PDN connection) wants to update the PGW F-TEID for a given PDN connection, it can send a Create/Update/Delete Bearer Request message, but it does not require SGW to store the new PGW F-TEID. Instead, the MME performs an SGW relocation procedure as described in the Enhancement 3 using the new PGW F-TEID as received in the Create/Update/Delete Bearer Request message.

There are, proposed herein, various embodiments which address one or more of the issues disclosed herein.

Certain embodiments may provide one or more of the following technical advantage(s). Embodiments of the solutions described herein enable the restoration of PDN connection(s) at the failure of the serving PGW (of the said PDN connection(s)), where the embodiments of the solutions described herein have very few impact on the legacy system, e.g. in the MME and SGW.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3 GPP) Fifth Generation (5 G) NR network or an enhanced or evolved Node B (eNB) in a 3 GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3 GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3 GPP cellular communications system and, as such, 3 GPP terminology or terminology similar to 3 GPP terminology is oftentimes used. However, the concepts disclosed herein are not limited to a 3 GPP system.

Note that, in the description herein, reference may be made to the term "cell"; however, particularly with respect to 5 G NR concepts, beams may be used instead of cells and, as such, it is important to note that the concepts described herein are equally applicable to both cells and beams.

FIG. 5

Figure 5:
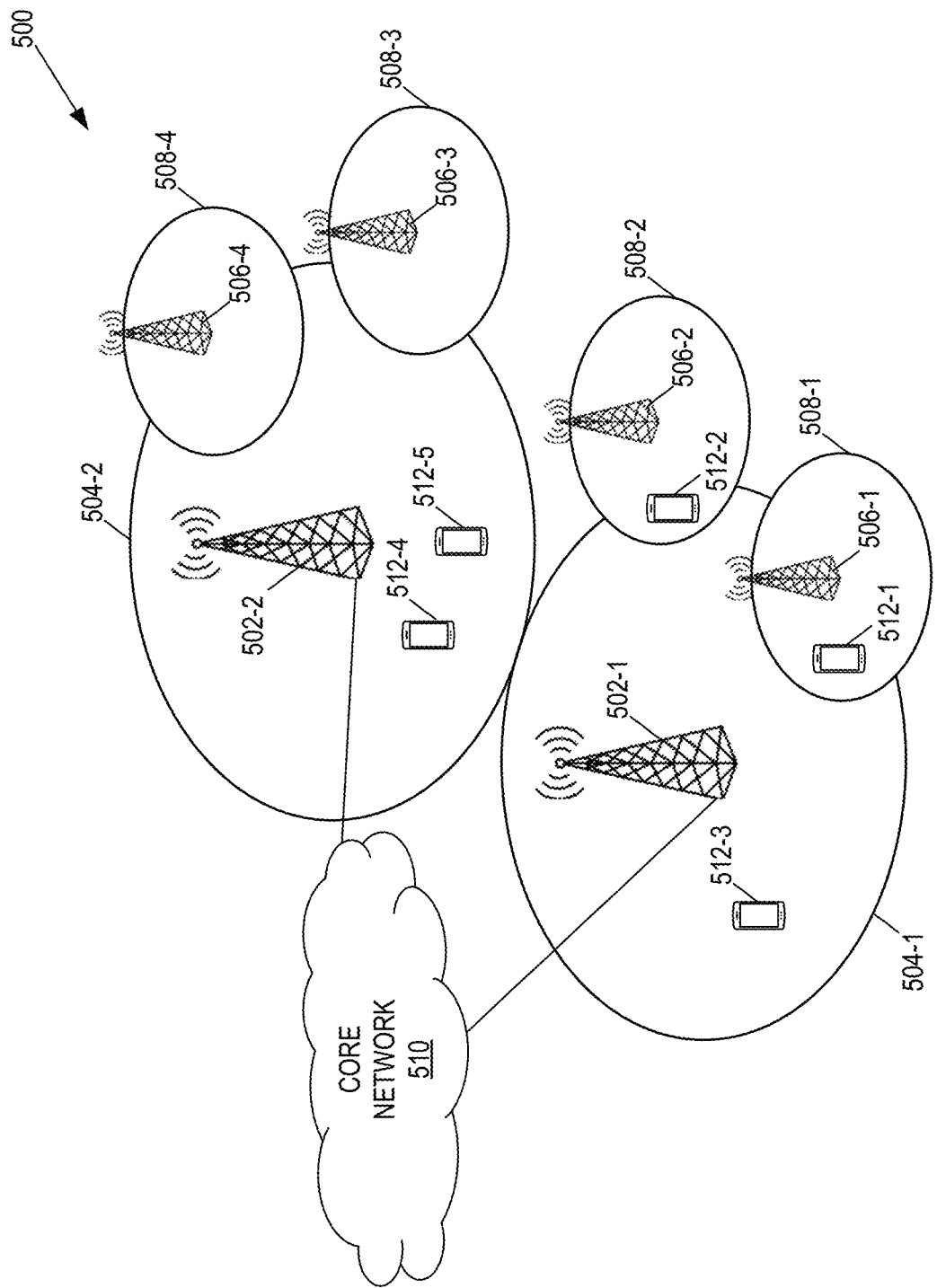
FIG. 5 illustrates one example of a cellular communications system 500 in which embodiments of the present disclosure may be implemented.

FIG. 5 illustrates one example of a cellular communications system 500 in which embodiments of the present disclosure may be implemented. In the embodiments described herein, the cellular communications system 500 is a system that enables interworking between a 5 G system (5 GS) including a Next Generation RAN (NG-RAN) and a 5 G Core (5 GC) and an Evolved Packet System (EPS) including an Evolved Universal Terrestrial RAN (E-UTRAN) and a Evolved Packet Core (EPC). In this example, the RAN includes base stations 502-1 and 502-2, which in the NG-RAN include NR base stations (gNBs) and optionally next generation eNBs (ng-eNBs) (e.g., LTE RAN nodes connected to the 5 GC) and in the E-UTRAN include eNBs, controlling corresponding (macro) cells 504-1 and 504-2. The base stations 502-1 and 502-2 are generally referred to herein collectively as base stations 502 and individually as base station 502. Likewise, the (macro) cells 504-1 and 504-2 are generally referred to herein collectively as (macro) cells 504 and individually as (macro) cell 504. The RAN may also include a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The cellular communications system 500 also includes a core network(s) 510, which in the 5 G System (5 GS) is referred to as the 5 GC and in the EPS is referred to as the EPC. The base stations 502 (and optionally the low power nodes 506) are connected to the core network 510.

The base stations 502 and the low power nodes 506 provide service to wireless communication devices 512-1 through 512-5 in the corresponding cells 504 and 508. The wireless communication devices 512-1 through 512-5 are generally referred to herein collectively as wireless communication devices 512 and individually as wireless communication device 512. In the following description, the wireless communication devices 512 are oftentimes UEs, but the present disclosure is not limited thereto.

FIG. 6

Figure 6:
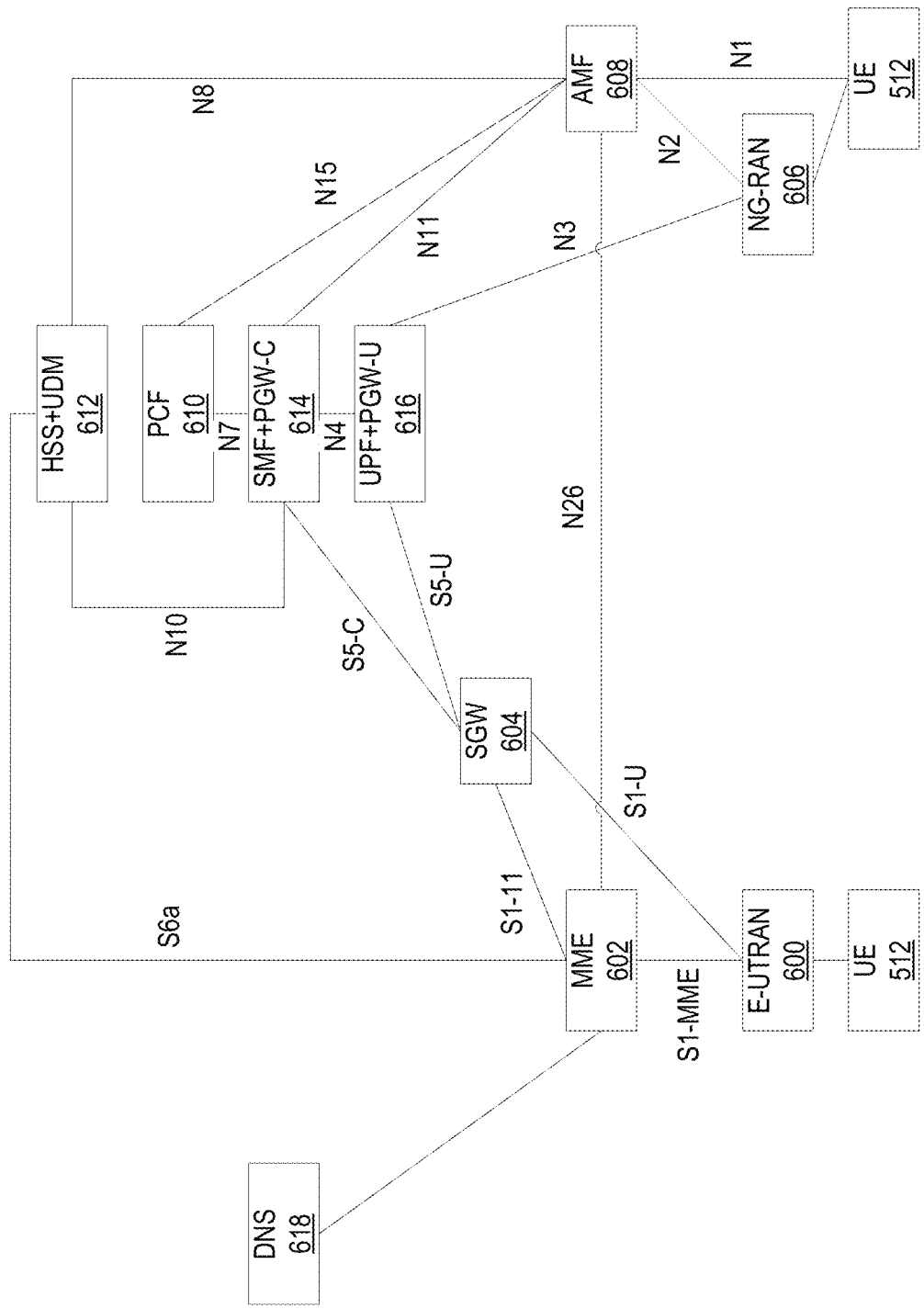
FIG. 6 illustrates one example of the cellular communications system 500 in which embodiments of the present disclosure may be implemented.

FIG. 6 illustrates one example of the cellular communications system 500 in which embodiments of the present disclosure may be implemented. In this example, the cellular communications system 500 includes both a 5 GS and an EPS with interworking between the 5 GS and EPS. As illustrated, in regard to the EPS, the cellular communications system 500 includes an E-UTRAN 600, which includes one or more base stations 502 that are, in this case, eNBs and a number of core network nodes of the EPC. As illustrated, the network nodes of the EPC include, in this example, an MME 602 and a SGW 604. In regard to the 5 GS, the cellular communications system 500 includes a NG-RAN 606, which includes one or more base stations that are, in this case, gNBs or ng-eNBs and a number of NFs of the 5 GC. As illustrated, the NFs include an AMF 608 and a PCF 610. In addition, to enable interworking between the 5 GS and the EPS, the cellular communications system 500 includes a number of combined, or joint, NFs. The combined NFs include, in this example, a combined HSS and UDM 612 (also referred to herein as HSS+UDM 612 or HSS/UDM 612), a combined SMF and PGW-C 614 (also referred to herein as a SMF+PGW-C 614 or SMF/PGW-C 614), and a combined UPF and PGW-U 616 (also referred to herein as a UPF+PGW-U 616 or UPF/PGW-U 616). The cellular communications system 500, and in particular the MME 602, is able to communicate with a DNS 618 as described herein.

Embodiments of the present disclosure provide a new DNS solution and some enhancements to the solution proposed in C4-204184 to enable restoration of the PDN connections when the serving SMF/PGW-C has failed while the failed SMF/PGW-C belongs to a PGW/SMF-C set. The embodiments of the present disclosure described herein include either or both of the following two aspects:

A. new DNS solution, and

B. enhancements to the proposed solution (C4-204-184), each of which is described below.

A. Enhanced DNS Solution

Since the SMF/PGW-C's (e.g., two or more instances of the SMF/PGW-C 614, which are denoted herein as SMF/PGW-C 614-1, 614-2, etc.) belonging to the same SMF/PGW-C set will have the same functionalities, the PDN connection created by any SMF/PGW-C 614-x in the same SMF/PGW-C set (which are sometimes referred to simply as "PGW-Cs" or "PGWs" when referring to EPS functionality) can be handed over or served by any other SMF/PGW-C 614-y in the same SMF/PGW-C set. That means that, when the MME 602 performs a DNS procedure to select a PGW (i.e., to select a SMF/PGW-C 614), all PGWs (i.e., all SMF/PGW-C's) in the same SMF/PGW-C set will appear in the DNS response message. In one embodiment, information is added in the PGW Name Authority Pointer (NAPTR) records in the DNS 618 to enable the MME 602 to know that these PGWs (i.e., SMF/PGW-C's) pertain to the same PGW set (i.e., the same SMF/PGW-C set).

Hence, in one embodiment of the present disclosure, the PGW NAPTR record for the SMF/PGW-C 614 is enhanced, considering support of the NF set concept as a new network capability. In one example embodiment, a string (e.g., "+nc-set<setid>") is appended to the "app-protocol" name as specified in 3 GPP TS 23.003 (see, e.g., V16.3.0), clause 19.4.3, where string indicates the NF Set ID. In one particular example described herein, the string appended to the "app-protocol" name is "+nc-set<setId>", where the set<setId> is set to the first label of NF Set Id of a SMF set (i.e., a SMF/PGW-C set), as specified in clause 28.12 of 3 GPP TS 23.003. Thus, in one embodiment, a completely new character string e.g. "+set-<setId>" is appended to the "app-protocol" name as specified in TS 23.003, clause 19.4.3.

For example, in one embodiment, the follow string is added into a PGW NAPTR record:
    x-3gpp-pgw: x-s5-gtp+nc-set<setId>", "x-3gpp-pgw: x-s8-gtp+nc-set<setId>" or
    x-3gpp-pgw: x-s5-gtp+set-<setId>", "x-3gpp-pgw: x-s8-gtp+set-<setId>"

As one example, consider a scenario in which the MME 602 is trying to select a PGW for the Access Point Name (APN) "imsTV1". Therefore, the MME 602 uses the APN's Fully Qualified Domain Name (FQDN) to perform a DNS query for the NAPTR record of the PGW. Then, in the DNS 618, the PGW NAPTR record may be configured as shown below for SMF/PGW-Cs 614 pertaining to a PGW/SMF set that satisfies the DNS query.

```
imsTV1.apn          (
; IN NAPTR order pref. flag service             regexp replacement
  IN NAPTR 100 999 "a" "x-3gpp-pgw:x-s5-gtp+nc-set100:x-s8-gtp+nc-set100"    ""
topoff.vip1.gw01.nodes )
  IN NAPTR 200 999 "a" "x-3gpp-pgw:x-s5-gtp+nc-set100:x-s8-gtp+nc-set100"    ""
topoff.vip1.gw21.nodes
;
;
```

In above example, both gw01 and gw21 are pertaining to (e.g., belong to) a set with setId=100. In this example, the PGW/SMF SET FQDN will be
    "set100.smfset.5gc.mnc012.mcc345"
The bolded+nc-set100, may use a new character string, e.g. set-100, instead.

Note that, with Solution A, there will be even less SGW impact. The only impact is that the new PGW (taking over the old PGW) may still use Update Bearer Request message to inform the MME. See Enhancement 4 in Solution B below. While not essential for understanding the solutions described herein, the interested reader can also refer to 3 GPP TS 29.303, clause 5.8.2 SGW, PGW and GGSN Selection Procedure.

B. Enhancements to the Proposed Solution of CR C4-204184

In some embodiments, systems and methods are disclosed herein that use one or more of the following enhancements to the solution described in CR C4-204184.

Enhancement 1: In the Create Session Response message sent from the PGW, in addition to the PGW SET FQDN, the PGW may include a list of alternative PGW IP Addresses to be used by the MME in case the serving PGW has failed;

Enhancement 2: In addition to using PGW Restart Indication message to notify the MME that PGW has restarted or has failed, the MME can derive the PGW failure and re-select another alternative PGW if it receives a GTPv2 cause #100 (See clause 8.4 of TS 29.274) "Remote peer not responding" from the SGW. This is to solve the PGW partial failure.

Enhancement 3: When the MME has decided to reselect an alternative PGW, the MME uses (e.g., always) a Create Session Request message as in an SGW relocation procedure (as specified in 5.10.4 in TS 23.401) instead of using a Modify Bearer Request message. The MME sends the Create Session Request message with new PGW F-TEID of the alternative PGW to a (new) SGW. If the Create Session Request message was sent to the existing SGW, the existing SGW should consider this as a colliding case, as specified in 7.2.1 of TS 29.274 as below, but the SGW should keep the same SGW-U tunnel over S1 (towards eNB) and over S5/S8 (towards PGW-U) to avoid the signaling towards the SGW-U considering the remote S1 eNB GTP-U tunnel endpoint if available and remote S5/S8 PGW-U GTP-U tunnel endpoint provided by the MME in the Create Session Request message is the same as the existing ones (since user plane path is not impacted).

If the new Create Session Request received by the SGW collides with an existing active PDN connection context (the existing PDN connection context is identified with the tuple [IMSI, EPS Bearer ID], where IMSI shall be replaced by TAC and SNR part of ME Identity for emergency or RLOS attached UE without UICC or authenticated IMSI), this Create Session Request shall be treated as a request for a new session. Before creating the new session, the SGW should delete:

the existing PDN connection context locally, if the Create Session Request is received with the TEID set to zero in the header, or if it is received with a TEID not set to zero in the header and it collides with the default bearer of an existing PDN connection context;

the existing dedicated bearer context locally, if the Create Session Request collides with an existing dedicated bearer context and the message is received with a TEID not set to zero in the header.

In the former case, if the PGW S5/S8 IP address for control plane received in the new Create Session Request is different from the PGW S5/S8 IP address for control plane of the existing PDN connection, the SGW should also delete the existing PDN connection in the corresponding PGW by sending a Delete Session Request message.

NOTE that, the MME need not immediately to send Create Session Request message, e.g. for those UEs in idle mode.

Enhancement 4: When the failed PGW or a new PGW (taking over the PDN connection) wants to update the PGW F-TEID for a given PDN connection, it can send a Create/Update/Delete Bearer Request message, but it does not require SGW to store the new PGW F-TEID. Instead, the MME performs an SGW relocation procedure as described in the Enhancement 3 using the new PGW F-TEID as received in the Create/Update/Delete Bearer Request message.

There are, proposed herein, various embodiments which address one or more of the issues disclosed herein.

Certain embodiments may provide one or more of the following technical advantage(s). Embodiments of the solutions described herein enable the restoration of PDN connection(s) at the failure of the serving PGW (of the said PDN connection(s)), where the embodiments of the solutions described herein have very few impact on the legacy system, e.g. in the MME and SGW.

FIGS. 7A-7C

Figure 7A:
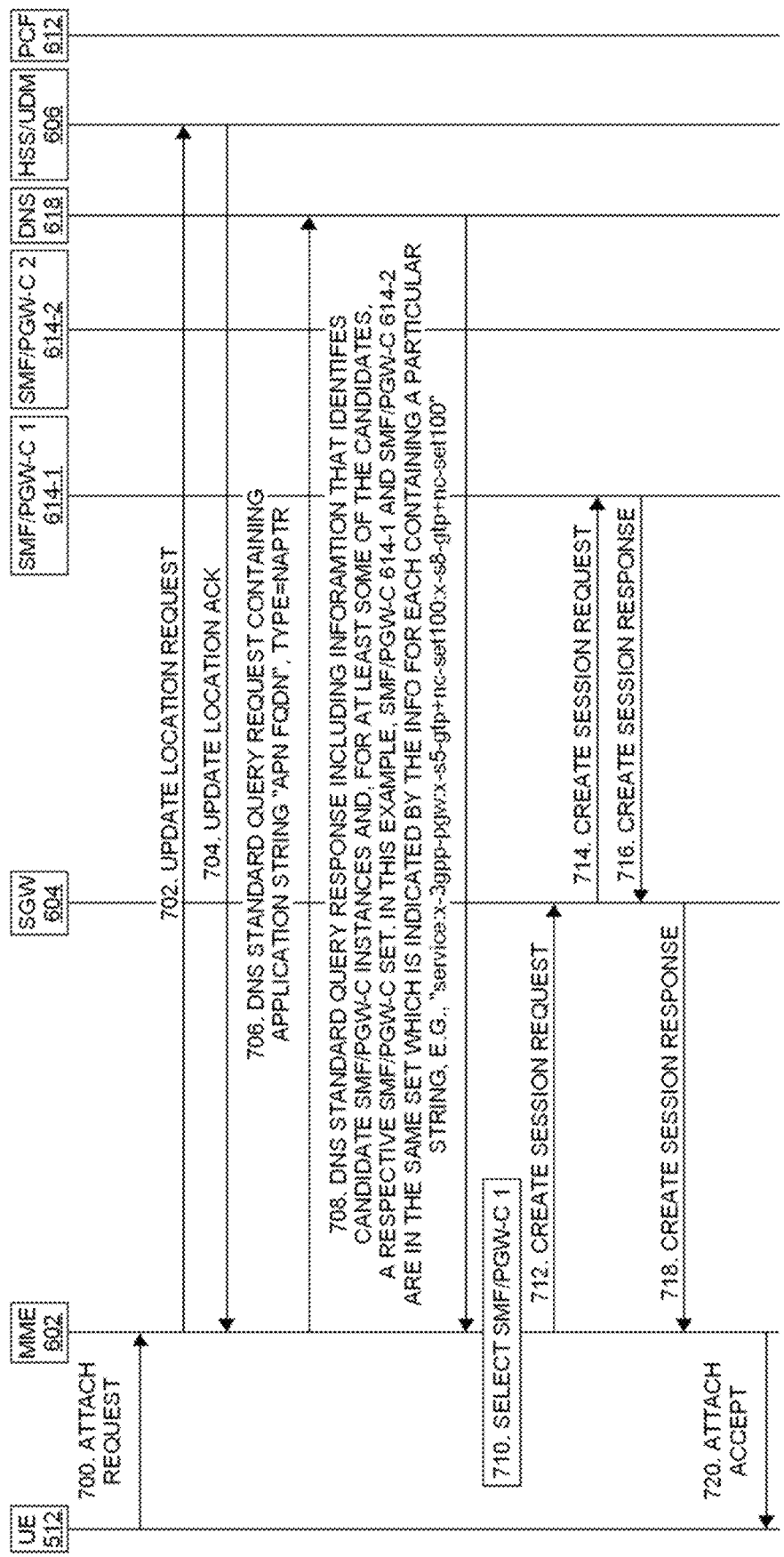
FIGS. 7A-7C illustrate the operation of the cellular communications system 500 of FIGS. 5 and 6 in accordance with at least some aspects of Solutions A and B described herein.
Figure 7B:
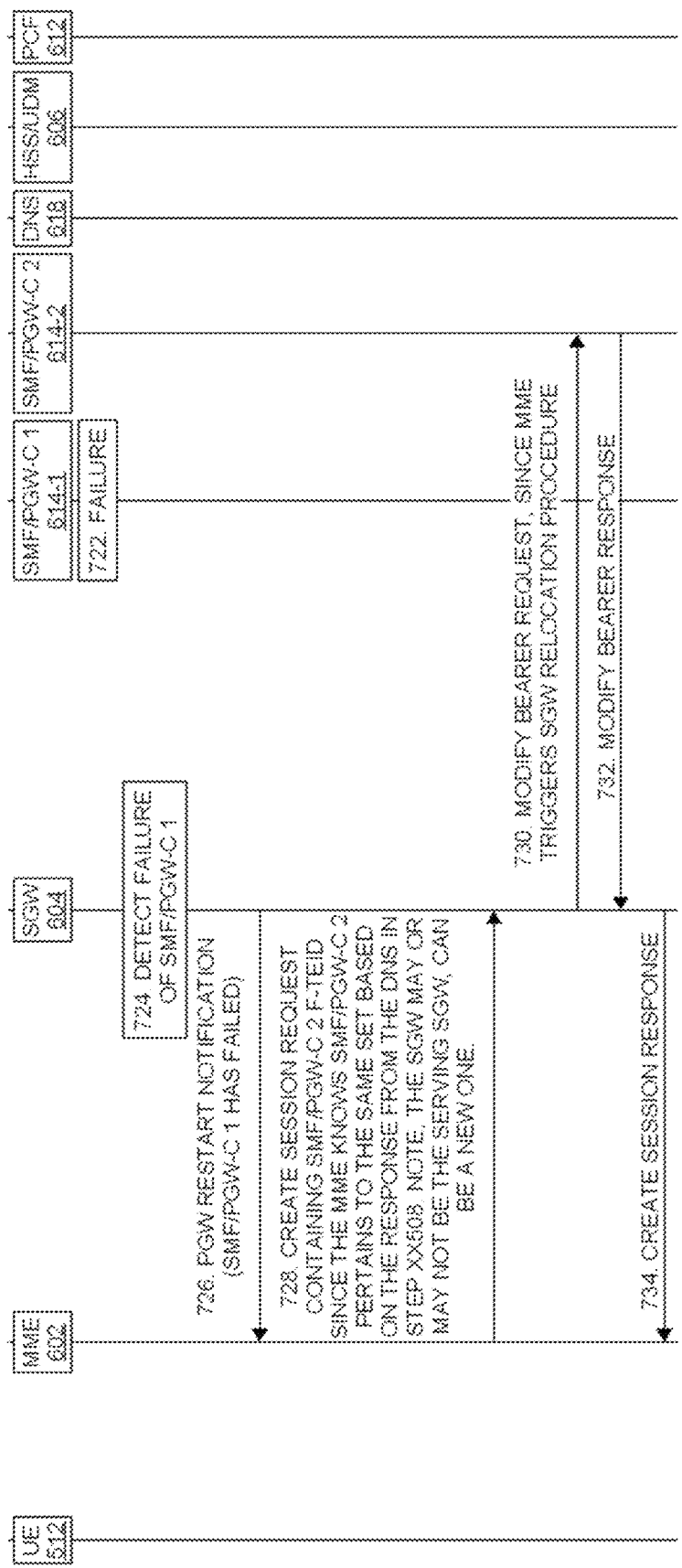
Figure 7C:
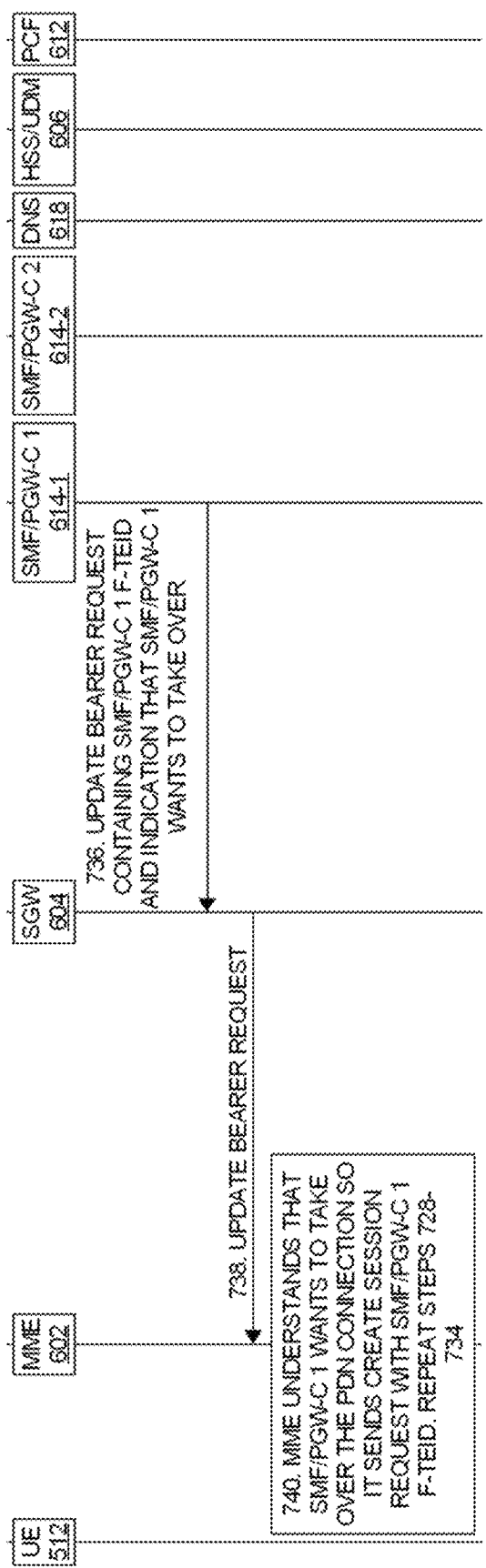

FIGS. 7A-7C illustrate the operation of the cellular communications system 500 of FIGS. 5 and 6 in accordance with at least some aspects of Solutions A and B described above. Note that, in this example, there is a SMF/PGW-C set (also referred to herein as a PGW set) that includes two (or more) SMF/PGW-C instances, which are denoted here as SMF/PGW-C 614-1 and SMF/PGW-C 614-2. Further note that the SMF/PGW-C 614-1 and the SMF/PGW-C 614-2 are sometimes referred to as PGW-C's or PGWs when referring to the PGW-C/PGW functionality of the SMF/PGW-C's 614-1 and 614-2. FIGS. 7A-7C illustrate a first alternative that uses an enhanced NAPTR DNS record in accordance with an embodiment of the present disclosure. The steps of the process of FIGS. 7A-7C are as follows:

Step 700: The UE 512 sends an attach request to the MME 602 via the E-UTRAN 600.

Step 702: The MME 602 sends an Update Location Request to the HSS/UDM 612.

Step 704: The HSS/UDM 612 returns an Update Location Acknowledgement to the MME 602.

Step 706: The MME 612 sends, to the DNS 618, a DNS Query Request containing, in this example, an application string "APN FQDN" (i.e., a DNS Query Request for the desired APN FQDN). The DNS Query Request is for a NAPTR in this embodiment.

Step 708: The DNS server 618 sends, in response to the MME 602, a DNS Query Response that includes information that identifies a number of candidate PGWs (i.e., a number of candidate SMF/PGW-C's 614) that satisfies the DNS Query Request of step 706. Th DNS Query Response also includes information that identifies two or more PGWs that belong to the same PGW set (i.e., two or more SMF/PGW-C's that belong to the same SMF/PGW-C set). In this example, the SMF/PGW-C 614-1 and the SMF/PGW-C 614-2 belong to the same set and are indicated as such. In this particular example, the DNS Query Response includes NAPTR information for the candidate PGWs. This NAPTR information includes a string (e.g., "+nc-set<setId>") is appended to the "app-protocol" name as specified in 3 GPP TS 23.003 (see, e.g., V16.3.0), clause 19.4.3, where string indicates the NF Set ID, as described above. In one particular example described herein, the string appended to the "app-protocol" name is "+nc-set<setId>", where the set<setId> is set to the first label of NF Set Id of a SMF set (i.e., a SMF/PGW-C set), as specified in clause 28.12 of 3 GPP TS 23.003.

Step 710: The MME 612 selects, in this example, SMF/PGW-C 614-1 (also referred to as SMF/PGW-C 1 or PGW 1) from the candidates identified in the DNS Query Response.

Step 712: The MME 612 sends a create session request to the SGW 604.

Step 714: The SGW 604 forwards the create session request to SMF/PGW-C 614-1.

Step 716: The SMF/PGW-C 614-1 sends a create session response to the SGW 604.

Step 718: The SGW 604 forwards the create session response to the MME 602.

Step 720: The MME 602 sends an attach accept message to the UE 512.

Step 722: At some point, the SMF/PGW-C 614-1 fails.

Step 724: The SGW 604 detects the failure of the SMF/PGW-C 614-1.

Step 726: The SGW 604 sends a PGW restart notification to the MME 602 in response to detecting the failure. In addition or alternatively, the MME 602 can derive the PGW failure and re-select another alternative PGW if it receives a GTPv2 cause #100 (See clause 8.4 of TS 29.274) "Remote peer not responding" from the SGW.

Step 728: The MME 602 sends, to the SGW 604 or a new SGW, a create session request that contains the F-TEID of another SMF/PGW-C in the same SMF/PGW-C set as the failed SMF/PGW-C 614-1, which in this example is the SMF/PGW-C 614-2, based on the information contained in the DNS query response of step 708.

In one embodiment, when determining to reselect an alternative SMF/PGW-C, the MME 602 uses Create Session Request message as in an SGW relocation procedure (as specified in 5.10.4 in TS 23.401) instead of using Modify Bearer Request message. The MME 602 sends Create Session Request message with new PGW F-TEID (of alternative PGW) to a (new) SGW. In one embodiment, if the Create Session Request message is sent to the existing SGW, the existing SGW considers this as colliding case, as specified in 7.2.1 of TS 29.274 as below, but the SGW keeps the same SGW-U tunnel over S1 (towards eNB) and over S5/S8 (towards PGW-U) to avoid the signaling towards the SGW-U considering the remote S1 eNB GTP-U tunnel endpoint if available and remote S5/S8 PGW-U GTP-U tunnel endpoint provided by the MME 602 in the Create Session Request message is the same as the existing ones (since user plane path is not impacted.

"If the new Create Session Request received by the SGW collides with an existing active PDN connection context (the existing PDN connection context is identified with the tuple [IMSI, EPS Bearer ID], where IMSI shall be replaced by TAC and SNR part of ME Identity for emergency or RLOS attached UE without UICC or authenticated IMSI), this Create Session Request shall be treated as a request for a new session. Before creating the new session, the SGW should delete:

the existing PDN connection context locally, if the Create Session Request is received with the TEID set to zero in the header, or if it is received with a TEID not set to zero in the header and it collides with the default bearer of an existing PDN connection context;

the existing dedicated bearer context locally, if the Create Session Request collides with an existing dedicated bearer context and the message is received with a TEID not set to zero in the header.

In the former case, if the PGW S5/S8 IP address for control plane received in the new Create Session Request is different from the PGW S5/S8 IP address for control plane of the existing PDN connection, the SGW should also delete the existing PDN connection in the corresponding PGW by sending a Delete Session Request message."

NOTE that, the MME need not immediately to send Create Session Request message, e.g. for those UEs in idle mode.

Step 730: The SGW 604 (or new SGW) sends a modify bearer request to the SMF/PGW-C 614-2. This is done since the MME 602 triggers SGW relocation procedure (see clause 5.10.4 of TS 23.401).

Step 730: The SMF/PGW-C 614-2 sends a modify bearer response to the SGW 604 (or new SGW).

Step 732: The SGW 604 (or new SGW) sends a create session response to the MME 602.

Step 734 (Optional): At some point, the SMF/PGW-C 614-1 is back online (i.e., the failure is over) and wants to take over the PDN connection. As such, the SMF/PGW-C 614-1 sends an update (or create or delete) bearer request to the SGW 604 (or new SGW) that contains the F-TEID of the SMF/PGW-C 614-1 and an indication that it wants to take over the PDN connection.

Step 736 (Optional): The SGW 604 (or new SGW) forwards the update (or create or delete) bearer request to the MME 602.

Step 738 (Optional): The MME 602 understands that the SMF/PGW-C 614-1 wants to take over the PDN connection. So, the MME 602 sends a create session request with the F-TEID of the SMF/PGW-C 614-1 (received in the update (or create or delete) bearer request) and steps 728 through 734 are repeated.

FIGS. 8A-8C

Figure 8A:
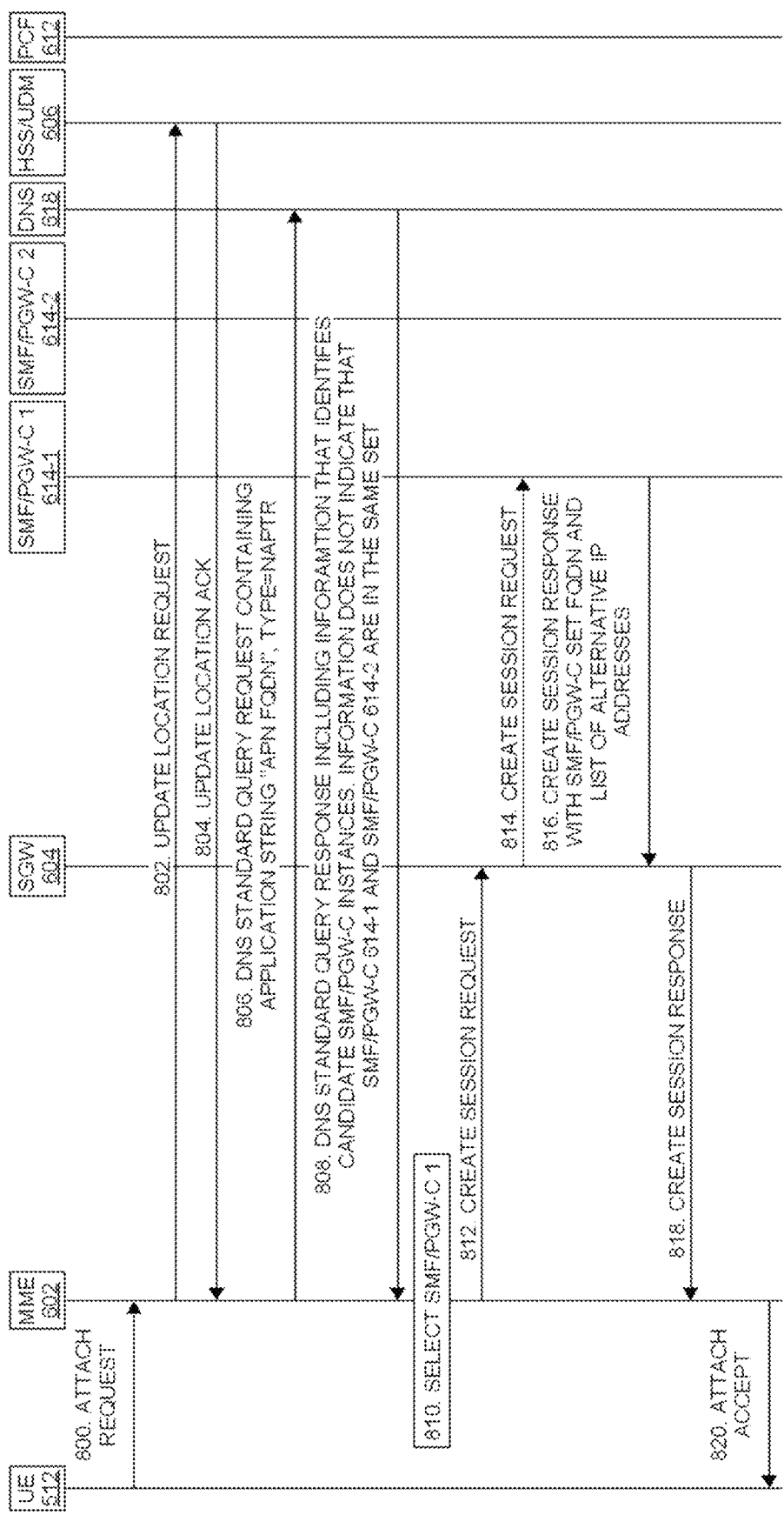
FIGS. 8A-8C illustrate the operation of the cellular communications system 500 of FIGS. 5 and 6 in accordance with at least some aspects of Solutions A and B described herein.
Figure 8B:
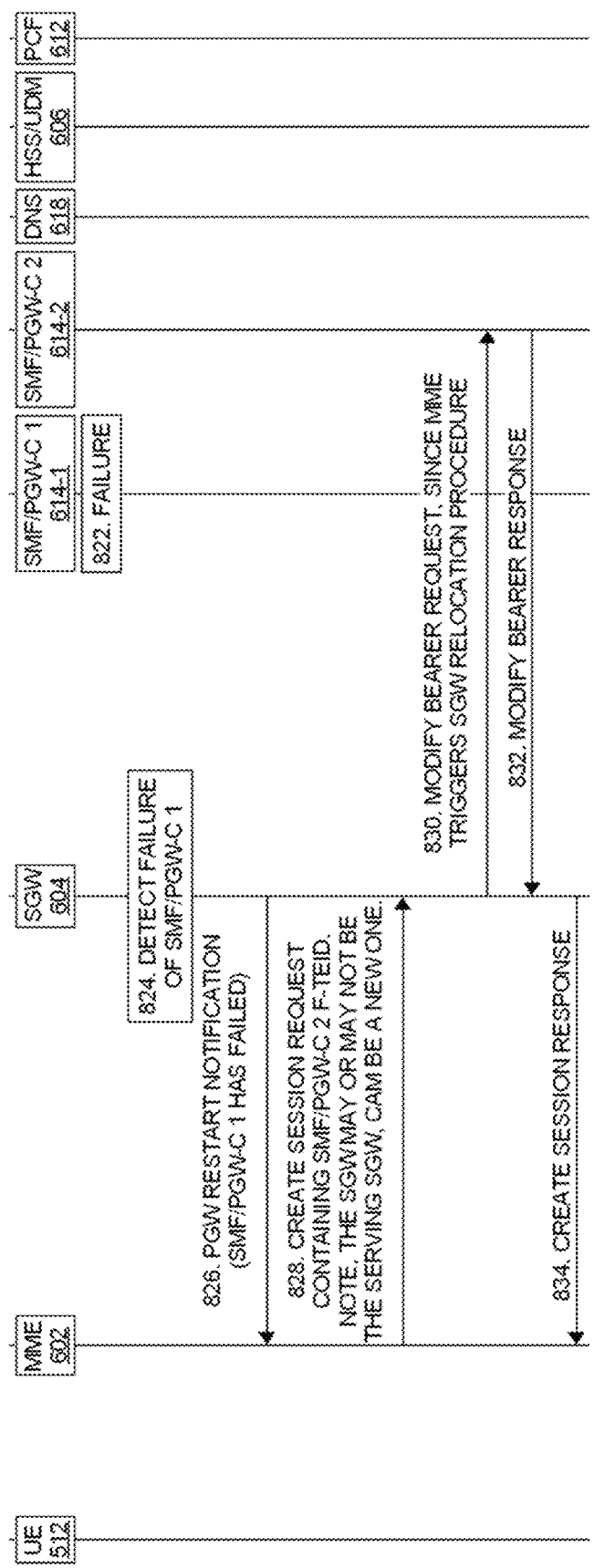
Figure 8C:
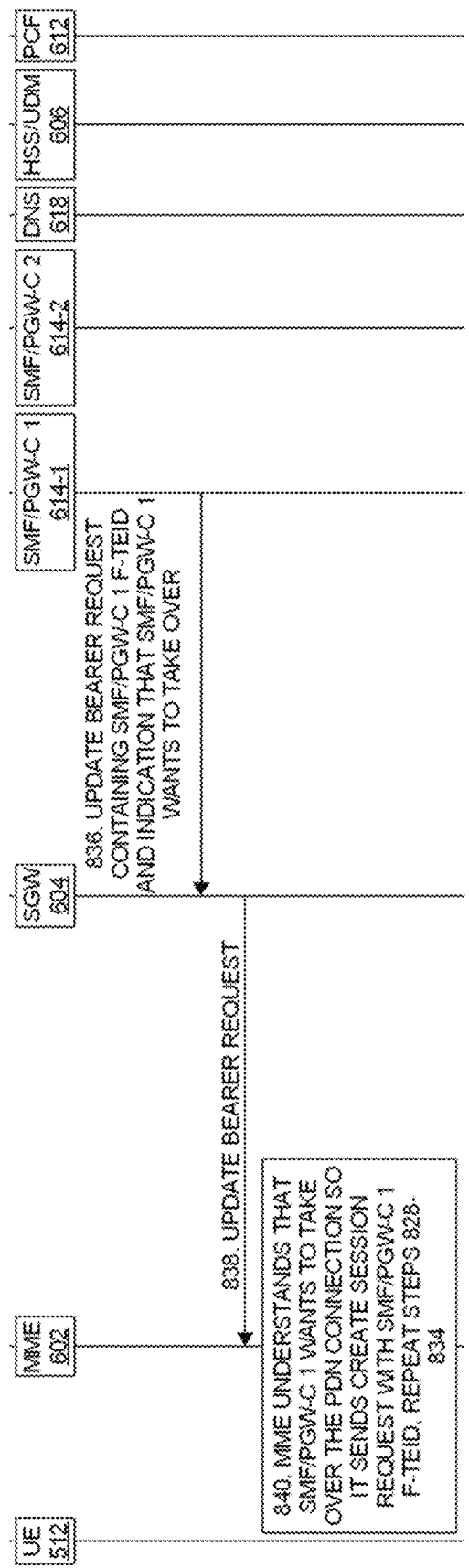

FIGS. 8A-8C illustrate the operation of the cellular communications system 500 of FIGS. 5 and 6 in accordance with at least some aspects of Solutions A and B described above. Note that, in this example, there is a SMF/PGW-C set (also referred to herein as a PGW set) that includes two (or more) SMF/PGW-C instances, which are denoted here as SMF/PGW-C 614-1 and SMF/PGW-C 614-2. Further note that the SMF/PGW-C 614-1 and the SMF/PGW-C 614-2 are sometimes referred to as PGW-C's or PGWs when referring to the PGW-C/PGW functionality of the SMF/PGW-C's 614-1 and 614-2. FIGS. 8A-8C illustrate a second alternative that uses existing NAPTR DNS record in accordance with an embodiment of the present disclosure. The steps of the process of FIGS. 8A-8C are as follows:

Step 800: The UE 512 sends an attach request to the MME 602 via the E-UTRAN 600.

Step 802: The MME 602 sends an Update Location Request to the HSS/UDM 612.

Step 804: The HSS/UDM 612 returns an Update Location Acknowledgement to the MME 602.

Step 806: The MME 602 sends, to the DNS 618, a DNS Query Request containing, in this example, an application string "APN FQDN" (i.e., a DNS Query Request for the desired APN FQDN). The DNS Query Request is for a NAPTR in this embodiment.

Step 808: The DNS server 618 sends, in response to the MME 602, a DNS Query Response that includes information that identifies a number of candidate PGWs (i.e., a number of candidate SMF/PGW-C's 614) that satisfies the DNS Query Request of step 806. In this embodiment, the DNS Query Response does not include information about the NF set. In this particular example, the DNS Query Response includes NAPTR information for the candidate PGWs.

Step 810: The MME 602 selects, in this example, SMF/PGW-C 614-1 (also referred to as SMF/PGW-C 1 or PGW 1) from the candidates identified in the DNS Query Response. However, unlike in the embodiment of FIGS. 7A-7C, the MME 602 does not know that the SMF/PGW-C 614-1 and the SMG/PGW-C 614-2 belong to the same SMF/PGW-C set.

Step 812: The MME 602 sends a create session request to the SGW 604.

Step 814: The SGW 604 forwards the create session request to SMF/PGW-C 614-1.

Step 816: The SMF/PGW-C 614-1 sends a create session response to the SGW 604. In this embodiment, the create session response includes 6a FQDN of the SMF/PGW-C set and a list of alternative IP addresses of other SMF/PGW-C's in the same SMF/PGW-C set. In this example, the list includes the IP address of the SMF/PGW-C 614-2.

Step 818: The SGW 604 forwards the create session response to the MME 602.

Step 820: The MME 602 sends an attach accept message to the UE 512.

Step 822: At some point, the SMF/PGW-C 614-1 fails.

Step 824: The SGW 604 detects the failure of the SMF/PGW-C 614-1.

Step 826: The SGW 604 sends a PGW restart notification to the MME 602 in response to detecting the failure. In addition or alternatively, the MME 602 can derive the PGW failure and re-select another alternative PGW if it receives a GTPv2 cause #100 (See clause 8.4 of TS 29.274) "Remote peer not responding" from the SGW.

Step 828: The MME 602 sends, to the SGW 604 or a new SGW, a create session request that contains the F-TEID of another SMF/PGW-C in the same SMF/PGW-C set as the failed SMF/PGW-C 614-1, which in this example is the SMF/PGW-C 614-2, based on the list of alternative IP addresses received in step 818.8

In one embodiment, when determining to reselect an alternative SMF/PGW-C, the MME 602 uses Create Session Request message as in an SGW relocation procedure (as specified in 5.10.4 in TS 23.401) instead of using Modify Bearer Request message. The MME 602 sends Create Session Request message with new PGW F-TEID (of alternative PGW) to a (new) SGW. In one embodiment, if the Create Session Request message is sent to the existing SGW, the existing SGW considers this as colliding case, as specified in 7.2.1 of TS 29.274 as below, but the SGW keeps the same SGW-U tunnel over S1 (towards eNB) and over S5/S8 (towards PGW-U) to avoid the signaling towards the SGW-U considering the remote S1 eNB GTP-U tunnel endpoint if available and remote S5/S8 PGW-U GTP-U tunnel endpoint provided by the MME 602 in the Create Session Request message is the same as the existing ones (since user plane path is not impacted.

"If the new Create Session Request received by the SGW collides with an existing active PDN connection context (the existing PDN connection context is identified with the tuple [IMSI, EPS Bearer ID], where IMSI shall be replaced by TAC and SNR part of ME Identity for emergency or RLOS attached UE without UICC or authenticated IMSI), this Create Session Request shall be treated as a request for a new session. Before creating the new session, the SGW should delete:

the existing PDN connection context locally, if the Create Session Request is received with the TEID set to zero in the header, or if it is received with a TEID not set to zero in the header and it collides with the default bearer of an existing PDN connection context;

the existing dedicated bearer context locally, if the Create Session Request collides with an existing dedicated bearer context and the message is received with a TEID not set to zero in the header.

In the former case, if the PGW S5/S8 IP address for control plane received in the new Create Session Request is different from the PGW S5/S8 IP address for control plane of the existing PDN connection, the SGW should also delete the existing PDN connection in the corresponding PGW by sending a Delete Session Request message."

NOTE that, the MME need not immediately to send Create Session Request message, e.g. for those UEs in idle mode.

Step 830: The SGW 604 (or new SGW) sends a modify bearer request to the SMF/PGW-C 614-2. This is done since the MME 602 triggers SGW relocation procedure (see clause 5.10.4 of TS 23.401).

Step 832: The SMF/PGW-C 614-2 sends a modify bearer response to the SGW 604 (or new SGW).

Step 834: The SGW 604 (or new SGW) sends a create session response to the MME 602.

Step 836 (Optional): At some point, the SMF/PGW-C 614-1 is back online (i.e., the failure is over) and wants to take over the PDN connection. As such, the SMF/PGW-C 614-1 sends an update bearer request to the SGW 604 (or new SGW) that contains the F-TEID of the SMF/PGW-C 614-1 and an indication that it wants to take over the PDN connection.

Step 838 (Optional): The SGW 604 (or new SGW) forwards the update bearer request to the MME 602.

Step 840 (Optional): The MME 602 understands that the SMF/PGW-C 614-1 wants to take over the PDN connection. So, the MME 602 sends a create session request with the F-TEID of the SMF/PGW-C 614-1 and steps 7828 through 7834 are repeated.

FIG. 9

Figure 9:
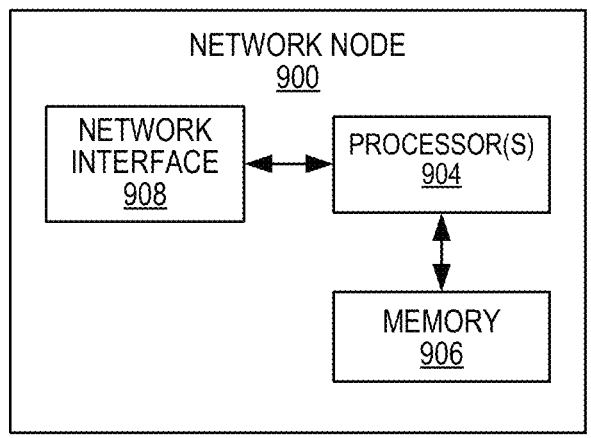
FIG. 9 is a schematic block diagram of a network node 900 according to some embodiments of the present disclosure.

FIG. 9 is a schematic block diagram of a network node 900 according to some embodiments of the present disclosure. Optional features are represented by dashed boxes. The network node 900 may be, for example, a core network node (e.g., SMF/PGW-C 614, 614-1, or 614-2, MME 602, SGW 604, DNS 618, HSS/UDM 606, PCF 612, or a network node that performs all or at least some of the functionality of any such core network node as described herein). As illustrated, the network node 900 includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. The one or more processors 904 operate to provide one or more functions of the network node 900 as described herein (e.g., one or more functions of SMF/PGW-C 614, 614-1, or 614-2, MME 602, SGW 604, DNS 618, HSS/UDM 606, or PCF 612, as described herein). In some embodiments, the function(s) are implemented in software that is stored, e.g., in the memory 906 and executed by the one or more processors 904.

FIG. 10

Figure 10:
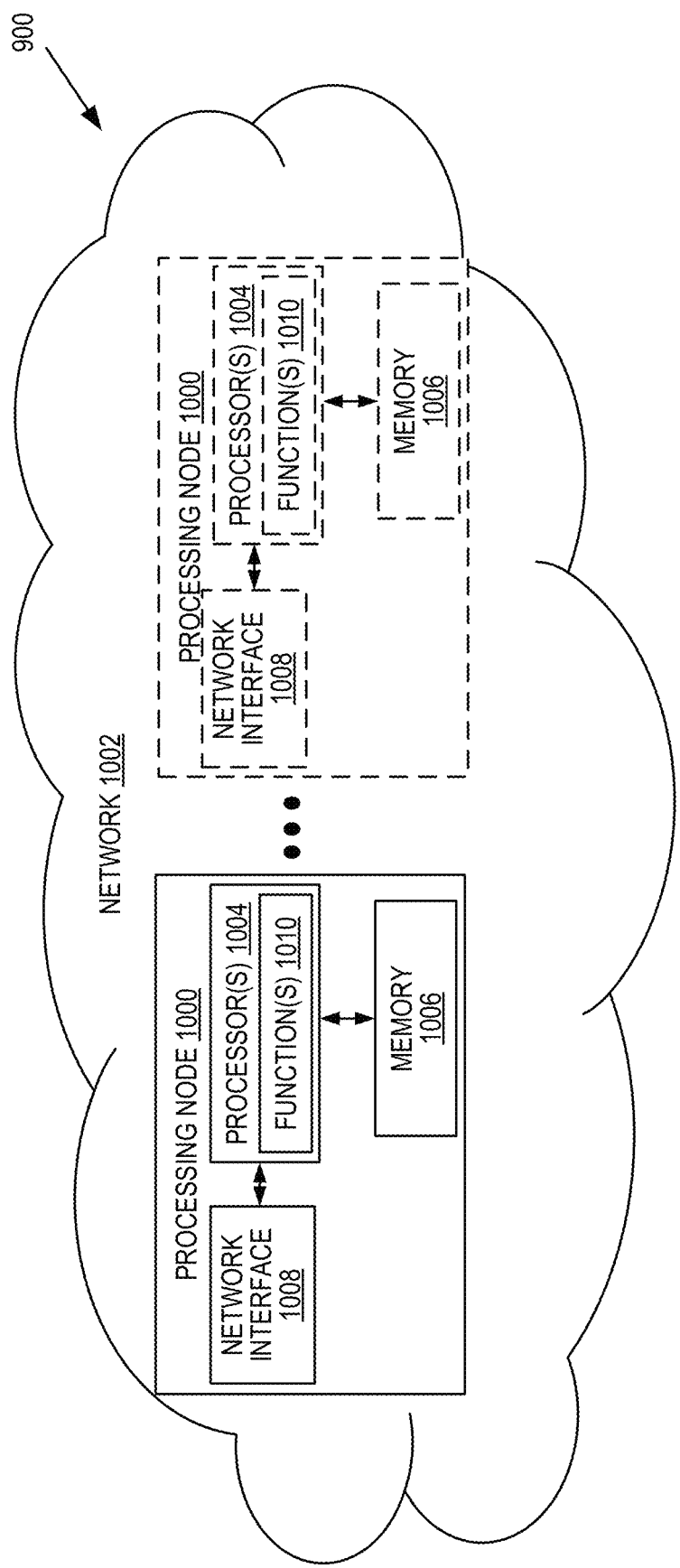
FIG. 10 is a schematic block diagram that illustrates a virtualized embodiment of the network node 900 according to some embodiments of the present disclosure.

FIG. 10 is a schematic block diagram that illustrates a virtualized embodiment of the network node 900 according to some embodiments of the present disclosure. Again, optional features are represented by dashed boxes. As used herein, a "virtualized" network node is an implementation of the network node 900 in which at least a portion of the functionality of the network node 900 is implemented as a virtual component(s) (e.g., via a virtual machine(s) executing on a physical processing node(s) in a network(s)). As illustrated, in this example, the network node 900 includes one or more processing nodes 1000 coupled to or included as part of a network(s) 1002. Each processing node 1000 includes one or more processors 1004 (e.g., CPUs, ASICs, FPGAs, and/or the like), memory 1006, and a network interface 1008.

In this example, functions 1010 of the network node 900 described herein (e.g., one or more functions of SMF/PGW-C 614, 614-1, or 614-2, MME 602, SGW 604, DNS 618, HSS/UDM 606, or PCF 612, as described herein) are implemented at the one or more processing nodes 1000 or distributed across the two or more of the processing nodes 1000 in any desired manner. In some particular embodiments, some or all of the functions 1010 of the network node 900 described herein are implemented as virtual components executed by one or more virtual machines implemented in a virtual environment(s) hosted by the processing node(s) 1000.

In some embodiments, a computer program including instructions which, when executed by at least one processor, causes the at least one processor to carry out the functionality of the network node 900 or a node (e.g., a processing node 1000) implementing one or more of the functions 1010 of the network node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 11

Figure 11:
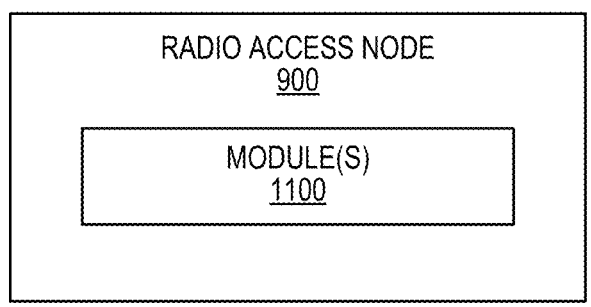
FIG. 11 is a schematic block diagram of the network node 900 according to some other embodiments of the present disclosure.

FIG. 11 is a schematic block diagram of the network node 900 according to some other embodiments of the present disclosure. The network node 900 includes one or more modules 1100, each of which is implemented in software. The module(s) 1100 provide the functionality of the network node 900 described herein (e.g., one or more functions of SMF/PGW-C 614, 614-1, or 614-2, MME 602, SGW 604, DNS 618, HSS/UDM 606, or PCF 612, as described herein). This discussion is equally applicable to the processing node 1000 of FIG. 10 where the modules 1100 may be implemented at one of the processing nodes 1000 or distributed across multiple processing nodes 1000.

Some Embodiments

Some embodiments described above may be summarized in the following manner:

1. A method of operation of a cellular communications system (500), the method comprising one or more of the following:

at a Mobility and Management Entity, MME, (602):
  receiving (700) an attach request from a User Equipment, UE, (512);
  sending (702) a location update request to a Home Subscriber Station, HSS, (606);
  receiving (704) a location update acknowledgement from the HSS (606);
  sending (706) a Domain Name Server, DNS, query request to a DNS (618), the DNS query comprising an Access Point Name, APN, Fully Qualified Domain Name, FQDN;
  receiving (708) a DNS query response from the DNS (618), the DNS query response comprising information that:
    indicates a plurality of candidate Packet Gateways, PGWs, (614) that satisfy the DNS query request; and
    indicates at least two PGWs (614-1 and 614-2) belong to a same PGW set, the at least PGWs comprising a first PGW (614-1) and a second PGW (614-2);

selecting (710) the first PGW (614-1);
sending (712), to a Serving Gateway, SGW, (604), a first create session request that comprises information that indicates the first PGW (614-1);
receiving (718) a first create session response from the SGW (604);
sending (720) an attach accept to the UE (512); and at the SGW (604):
receiving (712) the first create session request from the MME (602);
forwarding (714) the first create session request to the first PGW (614);
receiving (716) the first create session response from the first PGW (614); and
forwarding (718) the first create session response to the MME (602).

2. The method of embodiment 1 further comprising:

at the MME (602):
determining (726) that the first PGW (614-1) has failed;
responsive to determining (726) that the first PGW (614-1) has failed:
sending (728) a second create session request to the SGW (604) or a new SGW, the second create session request comprising information that indicates the second PGW (614-2); and
receiving (734) a second create session response from the SGW (604) or the new SGW;

at the SGW (604) or the new SGW:
receiving (728) the second create session request from the MME (602);
sending (730) a modify bearer request to the second PGW (614-2);
receiving (732) a modify fearer response from the second PGW (614-2); and
sending (734) the second create session response to the MME (602).

3. The method of embodiment 2 further comprising, at the SGW (604):
detecting (724) that the first PGW (614-1) has failed; and
sending (726) a notification that the first PGW (614-1) has failed to the MME (602).

4. The method of embodiment 2 or 3 wherein the SGW (602) to which the second create session request is sent from the MME (602) is the SGW (602) that received the first create session request, and the SGW (602) keeps a same SGW-U tunnel over S1 and over S5/S8.

5. The method of any of embodiments 2 to 4 wherein determining (726) that the first PGW (614-1) has failed comprises either or both of:
receiving (726) a restart notification from the SGW (602);
determining that the failure has occurred based on reception of a GTPv2 cause #100 "Remote peer not responding" from the SGW (602).

6. The method of any of embodiments 2 to 5 further comprising:
at the SGW (604) or the new SGW:
receiving (736) an create/update/delete bearer request from the first PGW (614-1), the create/update/delete bearer request comprising information that indicates that the first PGW (614-1) desires to take over the session for the wireless communication device (512); and
forwarding (738) the create/update/delete bearer request to the MME (602); and
at the MME (602):
receiving (738) the create/update/delete bearer request from the SGW (604) or the new SGW; and sending (740) a third create session request to the SGW (604), the new SGW, or a further new SGW, the third create session request comprising information that indicates the first PGW (614-1).

7. The method of any of embodiments 1 to 6 wherein the DNS query request is of a type NAPTR, and the information comprised in DNS query response comprises NAPTR information that indicates the plurality of candidate PGWs and the at least two candidate PGWs that are in the same PGW set.

8. The method of embodiment 7 wherein the NAPTR information comprises, for each of the at least two candidate PGWs that are in the same PGW set, a string appended to the "app-protocol" name, where the string indicates that the at least two candidate PGWs are in the same PGW set.

9 The method of claim 8 wherein:
the at least two candidate PGWs (614-1, 614-2) that are in the same PGW set are at least two candidate combined Session Management Function, SMF, and Packet Gateway Control Plane, PGW-C, instances;
the PGW set is a SMF/PGW-C set; and
the string comprises set<setId>, where the set<setId> is set to a first label of a NF set ID of the SMF/PGW-C set.

10. A method of operation of a Mobility and Management Entity, MME, (602) for a cellular communications system (500), the method comprising one or more of the following:
receiving (700) an attach request from a User Equipment, UE, (512);
sending (702) a location update request to a Home Subscriber Station, HSS, (606);
receiving (704) a location update acknowledgement from the HSS (606);
sending (706) a Domain Name Server, DNS, query request to a DNS (618), the DNS query comprising an Access Point Name, APN, Fully Qualified Domain Name, FQDN;
receiving (708) a DNS query response from the DNS (618), the DNS query response comprising information that:
indicates a plurality of candidate Packet Gateways, PGWs, (614) that satisfy the DNS query request; and
indicates at least two PGWs (614-1 and 614-2) belong to a same PGW set, the at least PGWs comprising a first PGW (614-1) and a second PGW (614-2);
selecting (710) the first PGW (614-1);
sending (712), to a Serving Gateway, SGW, (604), a first create session request that comprises information that indicates the first PGW (614-1);
receiving (718) a first create session response from the SGW (604);
sending (720) an attach accept to the UE (512).

11. The method of embodiment 10 further comprising:
determining (726) that the first PGW (614-1) has failed;
responsive to determining (726) that the first PGW (614-1) has failed:
sending (728) a second create session request to the SGW (604) or a new SGW, the second create session request comprising information that indicates the second PGW (614-2); and
receiving (734) a second create session response from the SGW (604) or the new SGW.

12. The method of embodiment 11 wherein the SGW (602) to which the second create session request is sent from the MME (602) is the SGW (602) to which the first create session request is sent, and the SGW (602) keeps a same SGW-U tunnel over S1 and over S5/S8.

13. The method of embodiments 11 or 12 wherein determining (726) that the first PGW (614-1) has failed comprises either or both of:
  receiving (726) a restart notification from the SGW (602);
  determining that the failure has occurred based on reception of a GTPv2 cause #100 "Remote peer not responding" from the SGW (602).

14. The method of any of embodiments 11 to 13 further comprising:
  receiving (738) a create/update/delete bearer request from the SGW (604) or the new SGW, the create/update/delete bearer request comprising information that indicates that the first PGW (614-1) desires to take over the session for the wireless communication device (512); and
  sending (740) a third create session request to the SGW (604), the new SGW, or a further new SGW, the third create session request comprising information that indicates the first PGW (614-1).

15. The method of any of embodiments 10 to 14 wherein the DNS query request is of a type NAPTR, and the information comprised in DNS query response comprises NAPTR information that indicates the plurality of candidate PGWs and the at least two candidate PGWs that are in the same PGW set.

16. The method of embodiment 15 wherein the NAPTR information comprises, for each of the at least two candidate PGWs that are in the same PGW set, a string appended to the "app-protocol" name, where the string indicates that the at least two candidate PGWs are in the same PGW set.

17. The method of claim 16 wherein:
  the at least two candidate PGWs (614-1, 614-2) that are in the same PGW set are at least two candidate combined Session Management Function, SMF, and Packet Gateway Control Plane, PGW-C, instances;
  the PGW set is a SMF/PGW-C set; and
  the string comprises set<setId>, where the set<setId> is set to a first label of a NF set ID of the SMF/PGW-C set.

18. A network node (900) adapted to perform the method of any of embodiments 10 to 17.

19. A method of operation of a cellular communications system (500), the method comprising one or more of the following:
  at a Mobility and Management Entity, MME, (602):
    receiving (800) an attach request from a User Equipment, UE, (512);
    sending (802) a location update request to a Home Subscriber Station, HSS, (606);
    receiving (804) a location update acknowledgement from the HSS (606);
    sending (806) a Domain Name Server, DNS, query request to a DNS (618), the DNS query comprising an Access Point Name, APN, Fully Qualified Domain Name, FQDN;
    receiving (808) a DNS query response from the DNS (618), the DNS query response comprising information that indicates a plurality of candidate Packet Gateways, PGWs, (614) that satisfy the DNS query request;
    selecting (810) the first PGW (614-1);
    sending (812), to a Serving Gateway, SGW, (604), a first create session request that comprises information that indicates the first PGW (614-1);
    receiving (818) a first create session response from the SGW (604), the first create session response comprising one or more alternate Internet Protocol, IP, addresses for one or more other PGWs (614-2) in a same PGW set;
    sending (820) an attach accept to the UE (512); and
  at the SGW (604):
    receiving (812) the first create session request from the MME (602);
    forwarding (814) the first create session request to the first PGW (614);
    receiving (816) the first create session response from the first PGW (614); and
    forwarding (818) the first create session response to the MME (602).

20. The method of embodiment 19 further comprising:
  at the MME (602):
    determining (826) that the first PGW (614-1) has failed;
    responsive to determining (826) that the first PGW (614-1) has failed:
      sending (8828) a second create session request to the SGW (604) or a new SGW, the second create session request comprising information that indicates the second PGW (614-2) (e.g., the IP address or F-TEID of the second PGW (614-2); and
      receiving (8834) a second create session response from the SGW (604) or the new SGW;
  at the SGW (604) or the new SGW:
    receiving (8828) the second create session request from the MME (602);
    sending (8830) a modify bearer request to the second PGW (614-2);
    receiving (8832) a modify fearer response from the second PGW (614-2); and
    sending (8834) the second create session response to the MME (602).

21. The method of embodiment 20 further comprising, at the SGW (604):
  detecting (824) that the first PGW (614-1) has failed; and
  sending (826) a notification that the first PGW (614-1) has failed to the MME (602).

22. The method of embodiment 20 or 21 wherein the SGW (602) to which the second create session request is sent from the MME (602) is the SGW (602) that received the first create session request, and the SGW (602) keeps a same SGW-U tunnel over S1 and over S5/S8.

23. The method of any of embodiments 20 to 22 wherein determining (726) that the first PGW (614-1) has failed comprises either or both of:
  receiving (826) a restart notification from the SGW (602);
  determining that the failure has occurred based on reception of a GTPv2 cause #100 "Remote peer not responding" from the SGW (602).

24. The method of any of embodiments 20 to 23 further comprising:
  at the SGW (604) or the new SGW:
    receiving (8836) an create/update/delete bearer request from the first PGW (614-1), the create/update/delete bearer request comprising information that indicates that the first PGW (614-1) desires to take over the session for the wireless communication device (512); and
    forwarding (8838) the create/update/delete bearer request to the MME (602); and
  at the MME (602):
    receiving (8838) the create/update/delete bearer request from the SGW (604) or the new SGW; and
    sending (8840) a third create session request to the SGW (604), the new SGW, or a further new SGW, the third create session request comprising information that indicates the first PGW (614-1).

25. A method of operation of a Mobility and Management Entity, MME, (602) for a cellular communications system (500), the method comprising one or more of the following:
receiving (800) an attach request from a User Equipment, UE, (512);
sending (802) a location update request to a Home Subscriber Station, HSS, (606);
receiving (804) a location update acknowledgement from the HSS (606);
sending (806) a Domain Name Server, DNS, query request to a DNS (618), the DNS query comprising an Access Point Name, APN, Fully Qualified Domain Name, FQDN;
receiving (808) a DNS query response from the DNS (618), the DNS query response comprising information that indicates a plurality of candidate Packet Gateways, PGWs, (614) that satisfy the DNS query request;
selecting (810) the first PGW (614-1);
sending (812), to a Serving Gateway, SGW, (604), a first create session request that comprises information that indicates the first PGW (614-1);
receiving (818) a first create session response from the SGW (604), the first create session response comprising one or more alternate Internet Protocol, IP, addresses for one or more other PGWs (614-2) in a same PGW set; and
sending (820) an attach accept to the UE (512).

26. The method of embodiment 25 further comprising:
determining (826) that the first PGW (614-1) has failed;
responsive to determining (826) that the first PGW (614-1) has failed:
sending (8828) a second create session request to the SGW (604) or a new SGW, the second create session request comprising information that indicates the second PGW (614-2) (e.g., the IP address or F-TEID of the second PGW (614-2); and
receiving (8834) a second create session response from the SGW (604) or the new SGW.

27. The method of embodiment 26 wherein the SGW (602) to which the second create session request is sent from the MME (602) is the SGW (602) that received the first create session request, and the SGW (602) keeps a same SGW-U tunnel over S1 and over S5/S8.

28. The method of any of embodiments 26 to 28 wherein determining (726) that the first PGW (614-1) has failed comprises either or both of:
receiving (826) a restart notification from the SGW (602);
determining that the failure has occurred based on reception of a GTPv2 cause #100 "Remote peer not responding" from the SGW (602).

29. The method of any of embodiments 26 to 28 further comprising:
receiving (8838) a create/update/delete bearer request from the SGW (604) or the new SGW, the create/update/delete bearer request comprising information that indicates that the first PGW (614-1) desires to take over the session for the wireless communication device (512); and
sending (8840) a third create session request to the SGW (604), the new SGW, or a further new SGW, the third create session request comprising information that indicates the first PGW (614-1).

30. A network node (900) adapted to perform the method of any of embodiments 25 to 29.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

What is claimed is:

1. A method of operation of a Mobility and Management Entity, MME, for a cellular communications system, the method comprising:
receiving an attach request from a User Equipment, UE;
sending a location update request to a Home Subscriber Station, HSS;
receiving a location update acknowledgement from the HSS;
sending a Domain Name Server, DNS, query request to a DNS, the DNS query comprising an Access Point Name, APN, Fully Qualified Domain Name, FQDN;
receiving a DNS query response from the DNS, the DNS query response comprising information that:
identifies a plurality of candidate combined Session Management Function and Packet Gateway Control Plane, SMF/PGW-C, instances that satisfy the DNS query request; and
identifies at least two candidate combined SMF/PGW-C instances that belong to a same SMF/PGW-C set, the at least two combined SMF/PGW-C instances comprising a first combined SMF/PGW-C instance and a second combined SMF/PGW-C instance;
selecting the first combined SMF/PGW-C instance;
sending, to a Serving Gateway, SGW, a first create session request that comprises information that indicates the first combined SMF/PGW-C instance;
receiving a first create session response from the SGW; and
sending an attach accept to the UE.

2. The method of claim 1, wherein the SMF/PGW-C instances in the SMF/PGW-C set support the same services and the same Network Slice(s).

3. The method of claim 1, further comprising:
determining that the first combined SMF/PGW-C instance has failed;

responsive to determining that the first combined SMF/PGW-C instance has failed:
sending a second create session request to the SGW or a new SGW, the second create session request comprising information that indicates the second combined SMF/PGW-C instance; and
receiving a second create session response from the SGW or the new SGW.

4. The method of claim 3, wherein the SGW to which the second create session request is sent from the MME is the SGW to which the first create session request is sent, and the SGW keeps a same SGW-U tunnel over S1 and over S5/S8.

5. The method of claim 3, wherein determining that the first combined SMF/PGW-C instance has failed comprises either or both of:
receiving a restart notification from the SGW;
determining that the failure has occurred based on reception of a GTPv2 cause #100 "Remote peer not responding" from the SGW.

6. The method of claim 3, further comprising:
receiving a create/update/delete bearer request from the SGW or the new SGW, the create/update/delete bearer request comprising information that indicates that the first combined SMF/PGW-C instance desires to take over the session for the wireless communication device; and
sending a third create session request to the SGW, the new SGW, or a further new SGW, the third create session request comprising information that indicates the first combined SMF/PGW-C instance.

7. The method of claim 3, wherein the DNS query request is of a type NAPTR, and the information comprised in DNS query response comprises NAPTR information that indicates the plurality of candidate combined SMF/PGW-C instances and the at least two candidate combined SMF/PGW-C instances that are in the same SMF/PGW-C set.

8. The method of claim 7, wherein the NAPTR information comprises, for each of the at least two candidate combined SMF/PGW-C instances that are in the same SMF/PGW-C set, a string appended to the "app-protocol" name, where the string indicates that the at least two candidate combined SMF/PGW-C instances are in the same SMF/PGW-C set.

9. The method of claim 8, wherein:
the string comprises set<setId>, where the set<setId> is set to a first label of a NF set ID of the SMF/PGW-C set.

10. A network node that implements a Mobility and Management Entity, MME, for a cellular communications system, the network node comprising processing circuitry configured to cause the network node acting as the MME to:
receive an attach request from a User Equipment, UE;
send a location update request to a Home Subscriber Station, HSS;
receive a location update acknowledgement from the HSS;
send a Domain Name Server, DNS, query request to a DNS, the DNS query comprising an Access Point Name, APN, Fully Qualified Domain Name, FQDN;
receive a DNS query response from the DNS, the DNS query response comprising information that:
identifies a plurality of candidate combined Session Management Function and Packet Gateway Control Plane, SMF/PGW-C, instances that satisfy the DNS query request; and
identifies at least two candidate combined SMF/PGW-C instances that belong to a same SMF/PGW-C set, the at least two combined SMF/PGW-C instances comprising a first combined SMF/PGW-C instance and a second combined SMF/PGW-C instance;
select the first combined SMF/PGW-C instance;
send, to a Serving Gateway, SGW, a first create session request that comprises information that indicates the first combined SMF/PGW-C instance;
receive a first create session response from the SGW; and
sending an attach accept to the UE.

11. The network node of claim 10, wherein the SMF/PGW-C instances in the SMF/PGW-C set support the same services and the same Network Slice(s).

* * * * *